United States Patent
Eitschberger et al.

(10) Patent No.: US 11,307,011 B2
(45) Date of Patent: Apr. 19, 2022

(54) ELECTRONIC INITIATION SIMULATOR

(71) Applicant: DynaEnergetics Europe GmbH, Troisdorf (DE)

(72) Inventors: Christian Eitschberger, Munich (DE); Sascha Thieltges, Siegburg (DE); Frank Graziola, Königswinter (DE)

(73) Assignee: DynaEnergetics Europe GmbH, Troisdorf (DE)

( * ) Notice: Subject to any disclaimer, the term of this patent is extended or adjusted under 35 U.S.C. 154(b) by 0 days.

(21) Appl. No.: 17/007,794

(22) Filed: Aug. 31, 2020

(65) Prior Publication Data
US 2020/0400417 A1    Dec. 24, 2020

Related U.S. Application Data

(63) Continuation-in-part of application No. 16/776,977, filed on Jan. 30, 2020, which is a continuation of
(Continued)

(51) Int. Cl.
| | |
|---|---|
| *H02H 3/00* | (2006.01) |
| *F42D 1/05* | (2006.01) |
| *H02H 3/20* | (2006.01) |
| *F42C 15/42* | (2006.01) |
| *F42D 1/055* | (2006.01) |
| *F42B 3/12* | (2006.01) |
| *F42C 15/40* | (2006.01) |

(52) U.S. Cl.
CPC .............. *F42D 1/05* (2013.01); *F42B 3/122* (2013.01); *F42C 15/40* (2013.01); *F42C 15/42* (2013.01); *F42D 1/055* (2013.01); *H02H 3/202* (2013.01)

(58) Field of Classification Search
None
See application file for complete search history.

(56) References Cited

U.S. PATENT DOCUMENTS 3,064,537 A * 11/1962 Baller .................... F41A 19/68
                                                        89/1.814
4,769,734 A     9/1988 Heinemeyer et al.
(Continued)

FOREIGN PATENT DOCUMENTS

AR          109754 A1       1/2019
AU       2011349529 A1 *    6/2013  .............. F42B 3/182
(Continued)

OTHER PUBLICATIONS

Czech Republic Industrial Property Office; Office Action for CZ Application No. 2019549; dated Feb. 25, 2021; 3 pages.
(Continued)

*Primary Examiner* — Stephen W Jackson
(74) *Attorney, Agent, or Firm* — Moyles IP, LLC

(57) ABSTRACT

An electronic initiation system for use with a firing panel may include an input connector, a plurality of electronic ignition circuits (EICs) operably coupled together in series, and an indicator operably coupled to an output of each EIC of the plurality of EICs. A first EIC of the plurality of EICs may be operably coupled to the input connector. The indicator is configured to generate an indication in response to an output of an EIC of the plurality of EICs satisfying a predetermined condition.

18 Claims, 16 Drawing Sheets

Related U.S. Application Data application No. 15/880,153, filed on Jan. 25, 2018, now Pat. No. 10,605,578, which is a continuation of application No. 15/499,439, filed on Apr. 27, 2017, now Pat. No. 9,915,513.

(60) Provisional application No. 62/894,174, filed on Aug. 30, 2019, provisional application No. 62/454,841, filed on Feb. 5, 2017.

(56) References Cited

U.S. PATENT DOCUMENTS

| | | |
|---|---|---|
| 4,860,653 A | 8/1989 | Abouav |
| 4,869,171 A | 9/1989 | Abouav |
| 4,986,183 A | 1/1991 | Jacob et al. |
| 5,042,594 A | 8/1991 | Gonzalez et al. |
| 5,090,321 A | 2/1992 | Abouav |
| 6,085,659 A | 7/2000 | Beukes et al. |
| 6,148,263 A | 11/2000 | Brooks et al. |
| 6,173,651 B1 | 1/2001 | Pathe et al. |
| 6,222,749 B1 | 4/2001 | Peron |
| 6,274,948 B1 | 8/2001 | Blank et al. |
| 6,283,227 B1 * | 9/2001 | Lerche ............... E21B 41/00 102/215 |
| 6,618,237 B2 | 9/2003 | Eddy et al. |
| 6,785,116 B1 | 8/2004 | Hummel et al. |
| 6,938,689 B2 | 9/2005 | Farrant et al. |
| 7,066,261 B2 | 6/2006 | Vicente et al. |
| 7,234,521 B2 | 6/2007 | Shammai et al. |
| 7,301,750 B2 | 11/2007 | DeVries et al. |
| 7,565,927 B2 | 7/2009 | Gerez et al. |
| 7,588,080 B2 | 9/2009 | McCoy |
| 7,802,619 B2 | 9/2010 | Hurst et al. |
| 7,870,825 B2 | 1/2011 | Teowee |
| 7,980,309 B2 | 7/2011 | Crawford |
| 8,582,275 B2 | 11/2013 | Yan et al. |
| 8,689,868 B2 | 4/2014 | Lerche et al. |
| 8,695,506 B2 | 4/2014 | Lanclos |
| 9,464,508 B2 | 10/2016 | Lerche et al. |
| 9,518,454 B2 | 12/2016 | Current et al. |
| 9,523,271 B2 | 12/2016 | Bonavides et al. |
| 9,915,513 B1 | 3/2018 | Zemla et al. |
| 10,047,592 B2 | 8/2018 | Burgos et al. |
| 10,605,578 B2 | 3/2020 | Zemla et al. |
| 10,830,566 B2 | 11/2020 | Maxted et al. |
| 2005/0011390 A1 | 1/2005 | Jennings |
| 2012/0281829 A1 | 11/2012 | Rudakevych et al. |
| 2013/0220613 A1 | 8/2013 | Brooks et al. |
| 2016/0050724 A1 | 2/2016 | Moon et al. |
| 2017/0032653 A1 | 2/2017 | Crawford et al. |
| 2018/0045498 A1 | 2/2018 | Teowee et al. |

FOREIGN PATENT DOCUMENTS

| | | | |
|---|---|---|---|
| CA | 2557913 A1 * | 6/1999 | ............ F42D 1/045 |
| CA | 2385517 A1 | 4/2001 | |
| CN | 1217784 A | 5/1999 | |
| CN | 1545609 A | 11/2004 | |
| CN | 201184775 | 1/2009 | |
| CN | 201764910 U | 3/2011 | |
| CN | 202470915 U | 10/2012 | |
| CN | 203595461 U | 5/2014 | |
| CN | 104296608 A | 1/2015 | |
| CN | 104345214 A | 2/2015 | |
| DE | 3412798 A1 | 10/1985 | |
| DE | 4302009 A1 | 7/1994 | |
| DE | 4330195 C1 | 11/1994 | |
| DE | 19740019 A1 | 3/1999 | |
| DE | 10017703 A1 | 5/2001 | |
| DE | 102004044683 A1 | 3/2006 | |
| DE | 102005031673 A1 | 3/2006 | |
| EP | 0207749 A2 | 1/1987 | |
| EP | 1644692 B1 | 12/2009 | |
| ES | 2000183 | 1/1988 | |
| JP | 2001515815 A | 9/2001 | |
| WO | 9721067 A1 | 6/1997 | |
| WO | 9745696 A1 | 12/1997 | |
| WO | 1998046965 A1 | 10/1998 | |
| WO | 2009846965 A1 | 10/1998 | |
| WO | 9912773 A1 | 3/1999 | |
| WO | 0123827 A1 | 4/2001 | |
| WO | 2011027991 A2 | 3/2011 | |
| WO | 2018141423 A1 | 8/2018 | |
| WO | 2019147294 A1 | 8/2019 | |
| ZA | 200202372 B | 3/2003 | |

OTHER PUBLICATIONS

INPI Argentina; Office Action for AR Application No. 20170102706; dated Dec. 16, 2020; 3 pages.

The State Intellectual Property Office of P.R. China; Office Action for CN Application No. 201780082132.5; dated Mar. 5, 2021; 11 pages.

AEL Intelligent Blasting, Electronic Delay Detonators, Electronic Initiators, Product Catalogue 2018,21 pgs., https://www.aelworld.com/application/files/6915/4442/8861/ael-intelligent-blasting-differentitated-products-electronic-delay-detonators.pdf.

Allied Horizontal, Advancing Plug-and-Perf Safety and Reliability, Jul. 2015, 2 pgs, http://alliedhorizontal.com/wireline-services/perforating-services/.

AXXIS Digital Initiation System, Electronic Detonators, AXXIS Blasting Box, Apr. 28, 2019, 2 pgs., http://www.bme.co.za/products/electronic-detonators/surface/send/16-surface/27-axxis-blasting-box.

AXXIS Digital Initiation System, Electronic Detonators, AXXIS Smart Line Tester, Jun. 20, 2016,2 pgs., http://axxis.co.za/pebble.asp?id=7.

Babu et al., Programmable Electronic Delay Device for Detonator, Defence Science Journal, May 2013, 3 pages, vol. 63, No. 3, https://doaj.org/article/848a537b12ae4a8b835391bec9.

DetNet, DigiShot, 6 pgs., https://www.detnet.com/application/files/4714/9969/3136/DetNet-South-Africa-DigiShot-Brochure.pdf.

DMC, Boom Times, Winter 2016 Brochure, Letter from the President & CEO, Issue 9, 2016, 3 pgs.

Dynaenergetics, Plug-N-Perf Optimized, Jul. 2016, 6 pages http://www.dynaenergetics.com/uploads/files/56e6f94760245_Product_Brochures_DynaSelect_OnlineView.pdf.

European Patent Office, Invitation to Pay Additional Fees and Partial Search Report and Written Opinion of International App No. PCT/EP2017/069327, dated Oct. 20, 2017, 14 pages.

Forcit Explosives, Daveytronic Electronic Ignition System, Sep. 13, 2019,1 pg., https://forcit.fi/en/explosives-2/products-2/show/29/daveytronic-electronic-ignition-system.

International Search Report and Written Opinion of International App No. PCT/EP2017/069327,which is in the same family as U.S. Appl. No. 15/499,439, dated Dec. 11, 2017, 17 pages.

Kumar et al., Delay circuit for multiple detonator, IJISET—International Journal of Innovative Science, Engineering & Tech., May 2015, 6 pages, vol. 2 Issue 5, www.ijiset.com.

Kumar et al., Novel Miniature Firing circuit for semiconductor bridge detonator initiation, Armament Res. and Dev. Establishment, Feb. 14, 2015, 4 pages, http://www.academia.edu.

Ntellectual Property India; First Examination Report for IN Application No. 201947035642; dated Nov. 27, 2020; 5 pages.

ORLCA, Uni Tronic 600 Electronic Blasting System, Technical Data Sheet, Jun. 19, 2016,2 pgs., www.oricaminingservices com/download/file_id_19567/.

USPTO, Notice of Allowance for U.S. Appl. No. 15/499,439, dated Nov. 17, 2017, 10 pgs.

USPTO, Notice of Allowance for U.S. Appl. No. 15/880,153, dated Nov. 22, 2019, 9 pgs.

USPTO; Non-Final Office Action of U.S. Appl. No. 15/499,439; dated Jul. 28, 2017; 13 pgs.

USPTO; Non-Final Office Action of U.S. Appl. No. 15/880,153; dated Oct. 1, 2019 8 pgs.

WIPO; Invitation to Pay Additional Fees for PCT App No. PCT/EP2017/069327; dated Oct. 20, 2017; 14 pages.

(56) References Cited

OTHER PUBLICATIONS

China National Intellectual Property Administration; Decision of Rejection for CN Application No. 201780082132.5; dated Aug. 30, 2021; 9 pages.
Czech Republic Industrial Property Office; Second Office Action for CZ Application No. 2019549; dated Jul. 28, 2021; 2 pages.
United States Patent and Trademark Office; Non-Final Office Action for U.S. Appl. No. 16/776,977 dated May 11, 2021; 6 pages.
United States Patent and Trademark Office; Notice of Allowance for U.S. Appl. No. 16/776,977 dated Aug. 27, 2021; 5 pages.

* cited by examiner

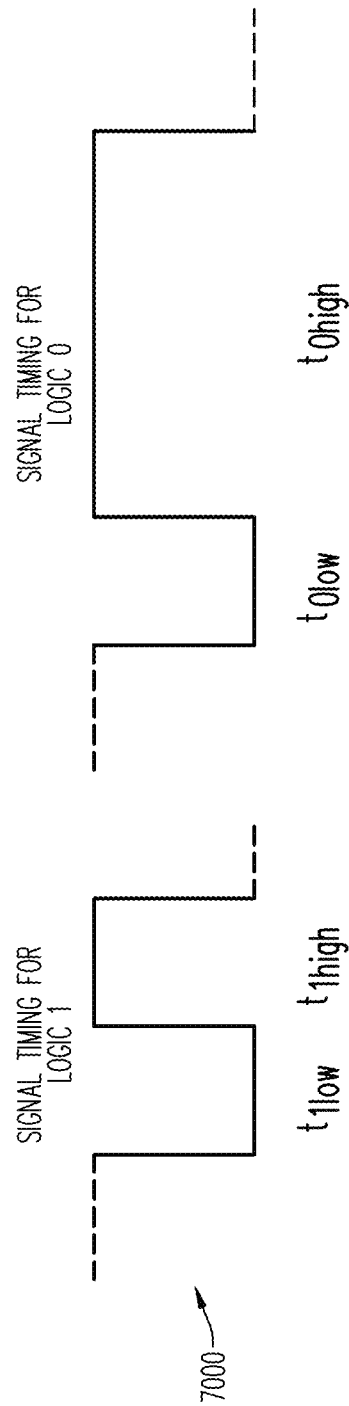

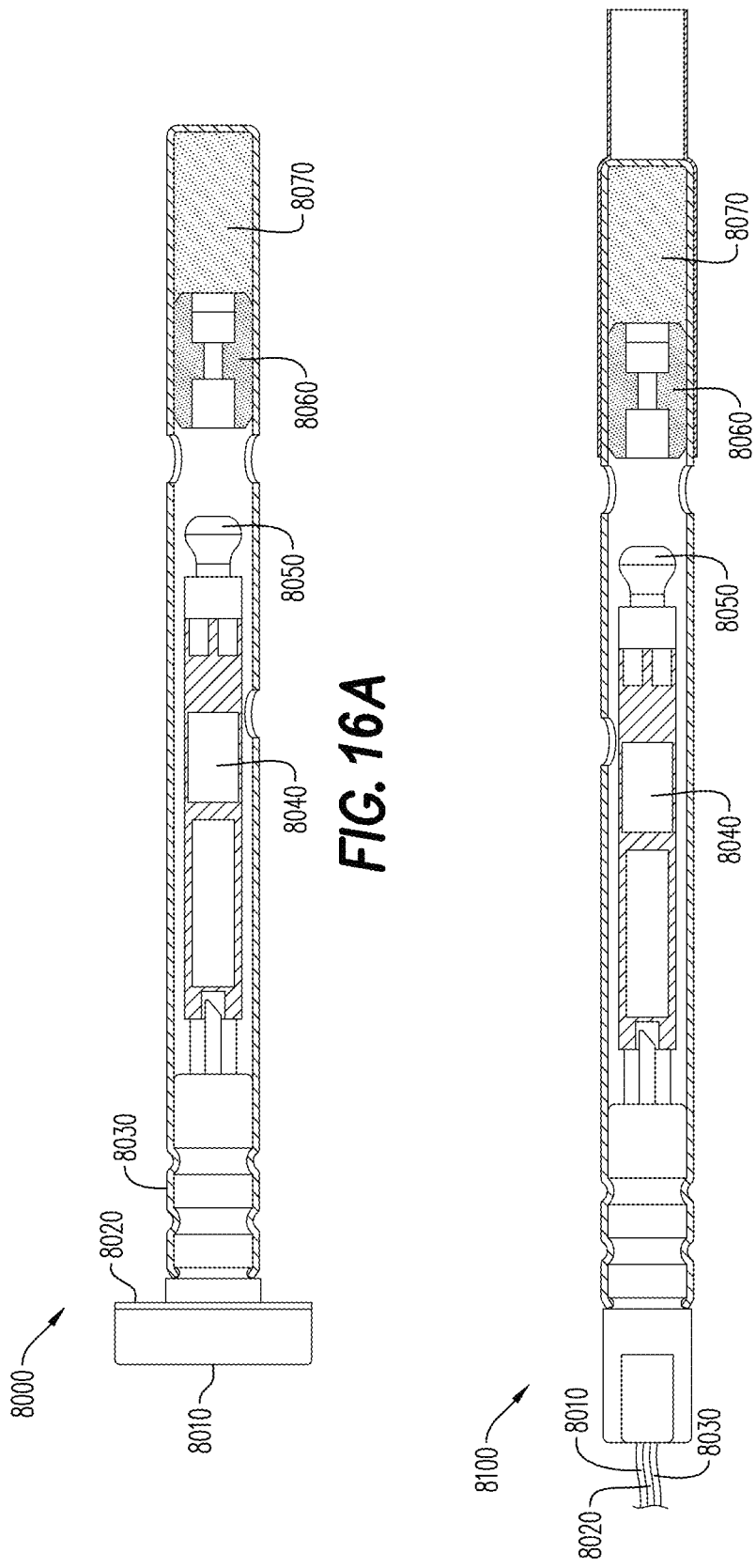

ELECTRONIC INITIATION SIMULATOR

CROSS-REFERENCE TO RELATED APPLICATIONS

This application is a continuation-in-part of U.S. application Ser. No. 16/776,977, filed Jan. 30, 2020, which is a continuation of U.S. application Ser. No. 15/880,153, filed Jan. 25, 2018 (issued as U.S. Pat. No. 10,605,578 on Mar. 31, 2020), which is a continuation of U.S. application Ser. No. 15/499,439, filed Apr. 27, 2017 (issued as U.S. Pat. No. 9,915,513 on Mar. 13, 2018), which claims the benefit of U.S. Provisional Application No. 62/454,841, filed Feb. 5, 2017, priority to each of which is claimed herein, and the contents of each of which are incorporated herein in their entirety. This application also claims the priority to U.S. Provisional Application No. 62/894,174, filed Aug. 30, 2019, the contents of which are incorporated herein by reference.

BACKGROUND OF THE DISCLOSURE

A perforating gun system employing explosive components is typically lowered into the casing in the borehole via a wireline or is tubing conveyed. The wireline is often unrolled from a motorized spool attached to pulleys and a wireline-truck on the surface (surface truck) adapted to this purpose. In other circumstances, derricks, slips, and other similar systems take the place of the surface truck. These provide an operator with an ability to raise and lower the perforating gun system inside the well. The wireline cable provides both a physical connection and an electrical connection between the equipment on the surface and the perforating gun system. Selective perforating gun systems often include more than one perforating gun, physically and electrically connected with each other in one tool string, which is then connected to the wireline. Generally, the tool string is conveyed a considerable distance from the surface depending on the depth of the well and the position of the intervals that are intended to be perforated.

Each perforating gun typically includes multiple shaped charges and an electrically-initiated initiator to detonate the shaped charges. An electrical signal from the wireline causes the electrically-initiated initiator to detonate the shaped charge, forcing a high energy perforating jet out of the perforation gun into a side of the casing at a high velocity, thereby perforating the casing, cement, borehole and adjacent geologic formation. U.S. Pat. No. 9,605,937 (commonly owned with the present application by DynaEnergetics Europe GmbH, Troisdorf, Germany), is fully incorporated herein by reference and provides information regarding perforating guns and initiator assemblies and their use.

It is desirable to precisely determine the total or maximum number of perforation guns and/or initiators that will be run into a well and maintain their electrical connections/communication with a wireline, particularly because the oil and natural gas industries have been drilling boreholes of greater depths and lengths in search of resources and because the ability to detonate and perforate selectively has taken on increasing importance. Accordingly, it may be desirable to develop an apparatus and method that would allow testing of the circuits similar to those in a wellbore tool string in order to confirm sufficient output of the circuits before time and money is spent lowering the tool string into the wellbore.

BRIEF DESCRIPTION

An exemplary embodiment of an electronic initiation system for use with a firing panel may include an input connector, a plurality of electronic ignition circuits (EICs) operably coupled together in series, and an indicator operably coupled to an output of each EIC of the plurality of EICs. A first EIC of the plurality of EICs may be operably coupled to the input connector. The indicator is configured to generate an indication in response to an output of an EIC of the plurality of EICs satisfying a predetermined condition.

An exemplary embodiment of method for controlling an electronic initiation system may include providing a first electronic initiation system including a first input connector and a first plurality of electronic ignition circuits (EICs) serially arranged and operably coupled to the first input connector. The method may further include operably coupling a firing panel to the first input connector of the first electronic initiation system, controlling the firing panel to transmit a signal to the first electronic initiation system, and receiving a signal from the first electronic initiation system in response to an output of an EIC of the first plurality of EICs satisfying a predetermined condition.

An exemplary embodiment of a system for simulating electronic initiation may include a firing panel, and a simulator operably coupled to the firing panel. The simulator 10 may include a first input connector, a first plurality of electronic ignition circuits (EICs) operably coupled together in series; and a first indicator operably coupled to an output of each EIC of the plurality of EICs. A first EIC 38 of the first plurality of EICs may be operably coupled to the first input connector 16. The first indicator may be configured to generate a first indication in response to an output of an EIC of the first plurality of EICs satisfying a predetermined condition.

BRIEF DESCRIPTION OF THE DRAWINGS

A more particular description will be rendered by reference to exemplary embodiments that are illustrated in the accompanying figures. Understanding that these drawings depict exemplary embodiments and do not limit the scope of this disclosure, the exemplary embodiments will be described and explained with additional specificity and detail through the use of the accompanying drawings in which:

FIG. 15A is a timing diagram of an exemplary embodiment of an electronic initiation circuit for controlling at least one detonator, according to an exemplary embodiment;

FIG. 15B is an equation diagram of an exemplary embodiment of an electronic initiation circuit for controlling at least one detonator, as shown in FIG. 15B, according to an exemplary embodiment;

FIG. 16A is a cross-sectional side view of an exemplary embodiment of a detonator having an electronic ignition circuit, according to an exemplary embodiment; and FIG. 16B is a cross-sectional side view of an exemplary embodiment of a detonator having an electronic initiation circuit, according to an exemplary embodiment.

Figure 1:
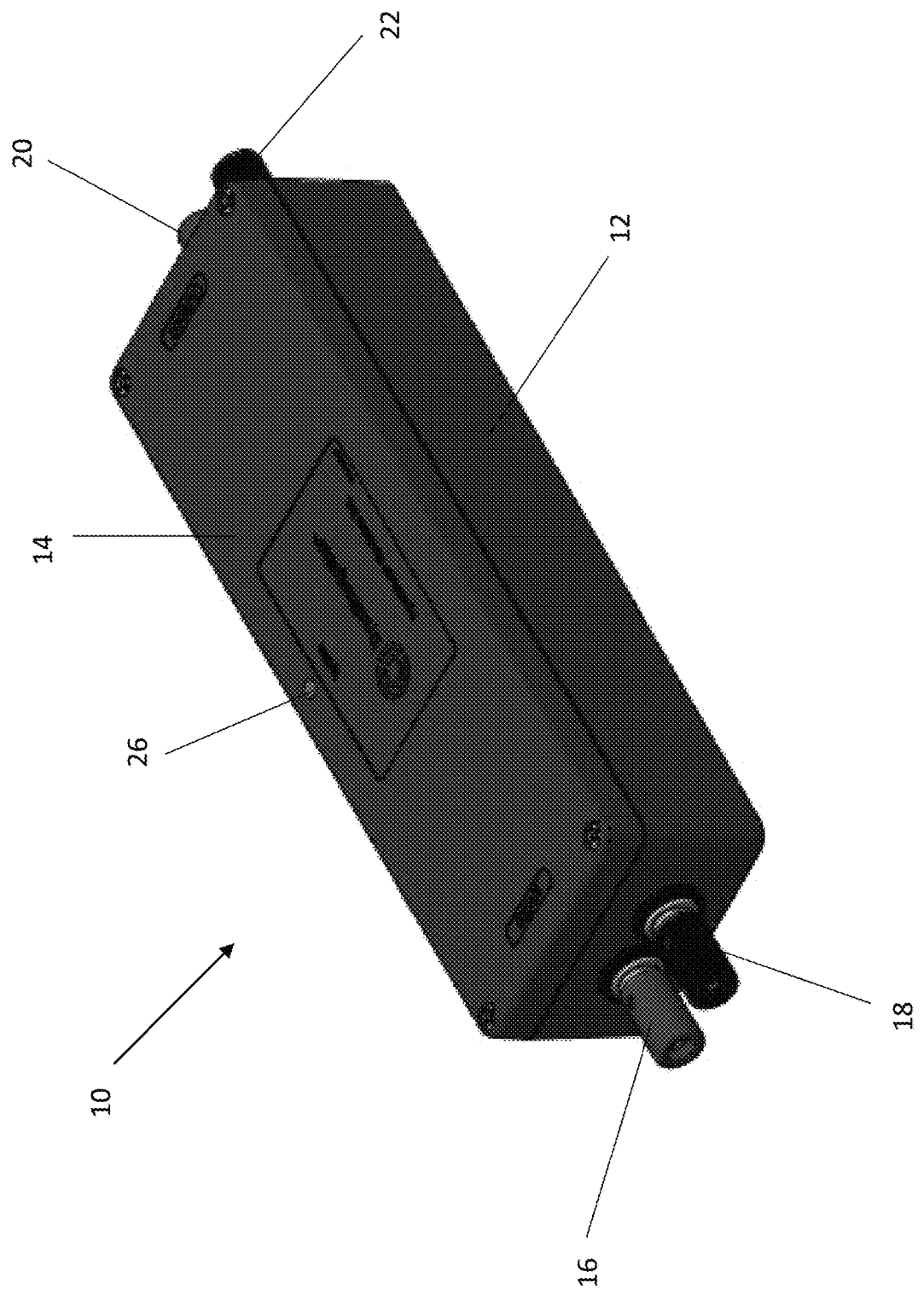
FIG. 1 is a perspective view of an electronic initiation system according to an exemplary embodiment.

Various features, aspects, and advantages of the exemplary embodiments will become more apparent from the following detailed description, along with the accompanying drawings in which like numerals represent like components throughout the figures and detailed description. The various described features are not necessarily drawn to scale in the drawings but are drawn to emphasize specific features relevant to some embodiments.

The headings used herein are for organizational purposes only and are not meant to limit the scope of the disclosure or the claims. To facilitate understanding, reference numerals have been used, where possible, to designate like elements common to the figures.

DETAILED DESCRIPTION

Reference will now be made in detail to various embodiments. Each example is provided by way of explanation and is not meant as a limitation and does not constitute a definition of all possible embodiments.

Embodiments described herein relate generally to devices, systems, and methods for assessing the quality of an electric signal supplied to one or more electronic ignition circuits through an arrangement of wiring and equipment necessary for down-well detonation of shaped charges for well perforation, e.g., using an electronic initiation system as described herein. For purposes of this disclosure, the phrases "devices," "systems," and "methods" may be used either individually or in any combination referring without limitation to disclosed components, grouping, arrangements, steps, functions, or processes.

For purposes of illustrating features of the embodiments, an exemplary embodiment will now be introduced and referenced throughout the disclosure. This example is illustrative and not limiting and is provided for illustrating the exemplary features of an electronic initiation system as described throughout this disclosure.

FIG. 1 shows an exemplary embodiment of an electronic initiation system 10. In one exemplary embodiment, the electronic initiation system 10 may be used as a simulator to simulate the control circuitry that is found in a wellbore tool string including a plurality of perforating guns. In other words, the circuitry within the electronic initiation system 10 is meant to duplicate the control circuitry used to selectively fire the perforating guns, so as to provide a simulation device with which the output of the control circuitry can be tested without having to assemble a tool string and without having to deploy a tool string into a wellbore. As seen in FIG. 1, the electronic initiation system 10 may include a housing 12 and a cover 14. The electronic initiation system 10 may first include a signal-in connector 16, a first ground connector 18, a signal-out connector 20, and a second ground connector 22. The electronic initiation system 10 may further include an indicator 26 for providing information about the operation of the electronic initiation system 10 to a user. FIG. 1 shows that the indicator 26 may be a light emitting diode (LED). However, it will be understood that the indicator 26 is not limited to this embodiment and may be any structure or component suitable for providing audio or visual information to the user. For example, the indicator 26 may be embodied as a speaker for providing audio information to a user; a series of LEDs; a digital display configured to display one or more letters, numbers, or other characters; a liquid-crystal display (LCD) screen; an LED screen; or any other medium suitable for conveying information to a user.

Figure 2:
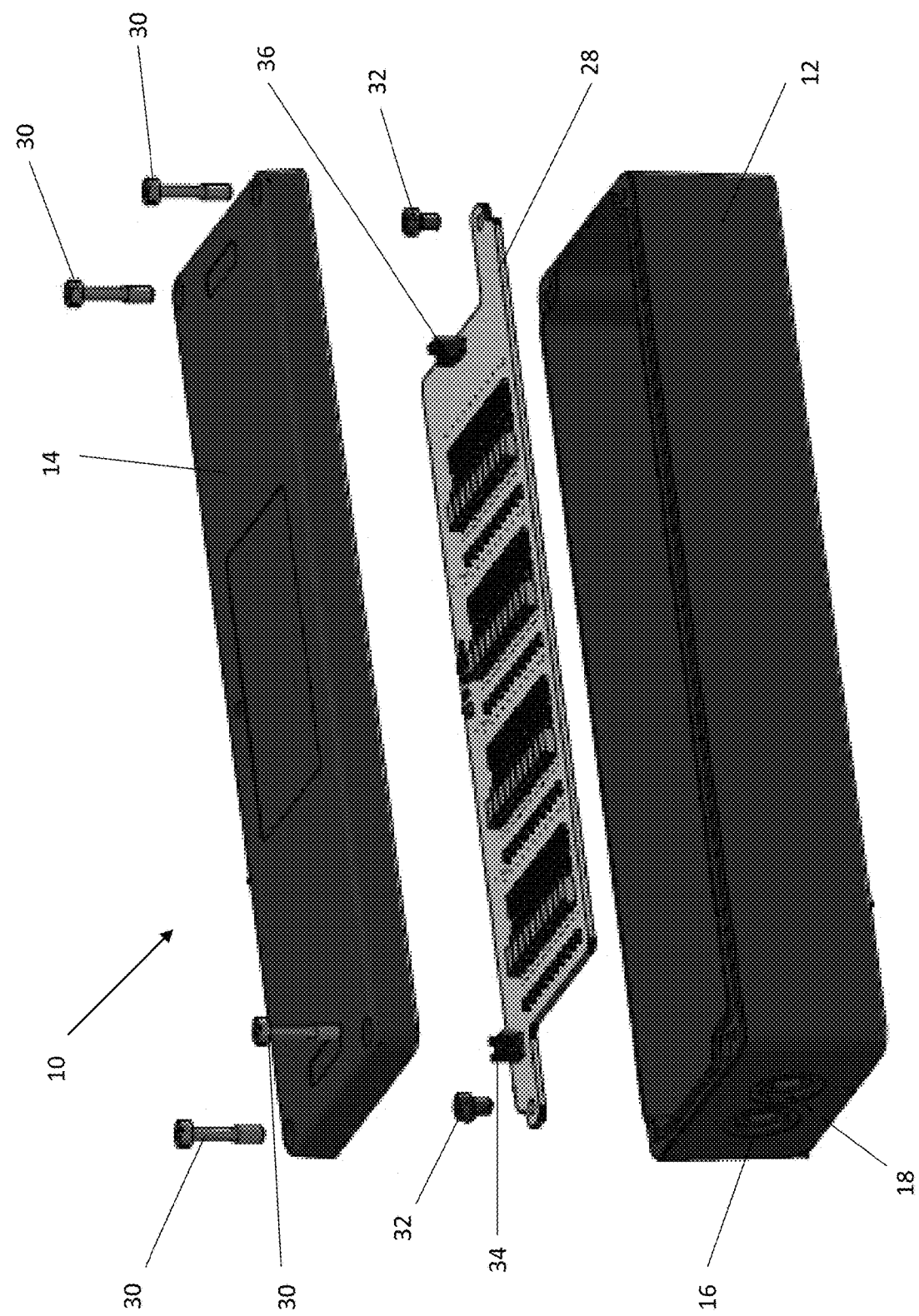
FIG. 2 is an exploded perspective view of an electronic initiation system according to an exemplary embodiment.

As seen in FIG. 2, the electronic initiation system 10 may include a circuit board 28 provided within the housing 12. The circuit board 28 may be mounted in an interior of the housing 12 via one or more circuit board screws 32. The cover 14 may be secured to the housing 12 via one or more cover screws 30. The circuit board 28 may be a printed circuit board (PCB), a surface-mount circuit board, or a circuit board with a combination of printed and surface-mounted components. The signal-in connector 16 may be operably coupled to the circuit board 28 so as to provide an input signal to the circuit board 28. The first ground connector 18 may be operably coupled to the circuit board 28 so as to provide a ground connection to the circuit board 28. The signal-in connector 16 and the first ground connector 18 may be operably coupled to the circuit board 28 via one or more wires (not shown) connecting the signal-in connector 16 and/or the first ground connector 18 to a first circuit board connector 34. The signal-out connector 20 may be operably coupled to the circuit board 28 so as to transmit an output from the circuit board 28 to another device, as described in further detail herein. The second ground connector 22 may be operably coupled to the circuit board 28 so as to provide a ground connection to the circuit board 28. The signal-out connector 20 and the second ground connector 22 may be operably coupled to the circuit board 28 via one or more wires (not shown) connecting the signal-out connector 20 and/or the second ground connector 22 to a second circuit board connector 36. The first ground connector 18 and the second ground connector 22 may be directly electrically connected such that a voltage at the first ground connector 18 is substantially equal to a voltage at the second ground connector 22. The circuit board 28 may be operably coupled to the indicator 26 via one or more wires (not shown).

Figure 3:
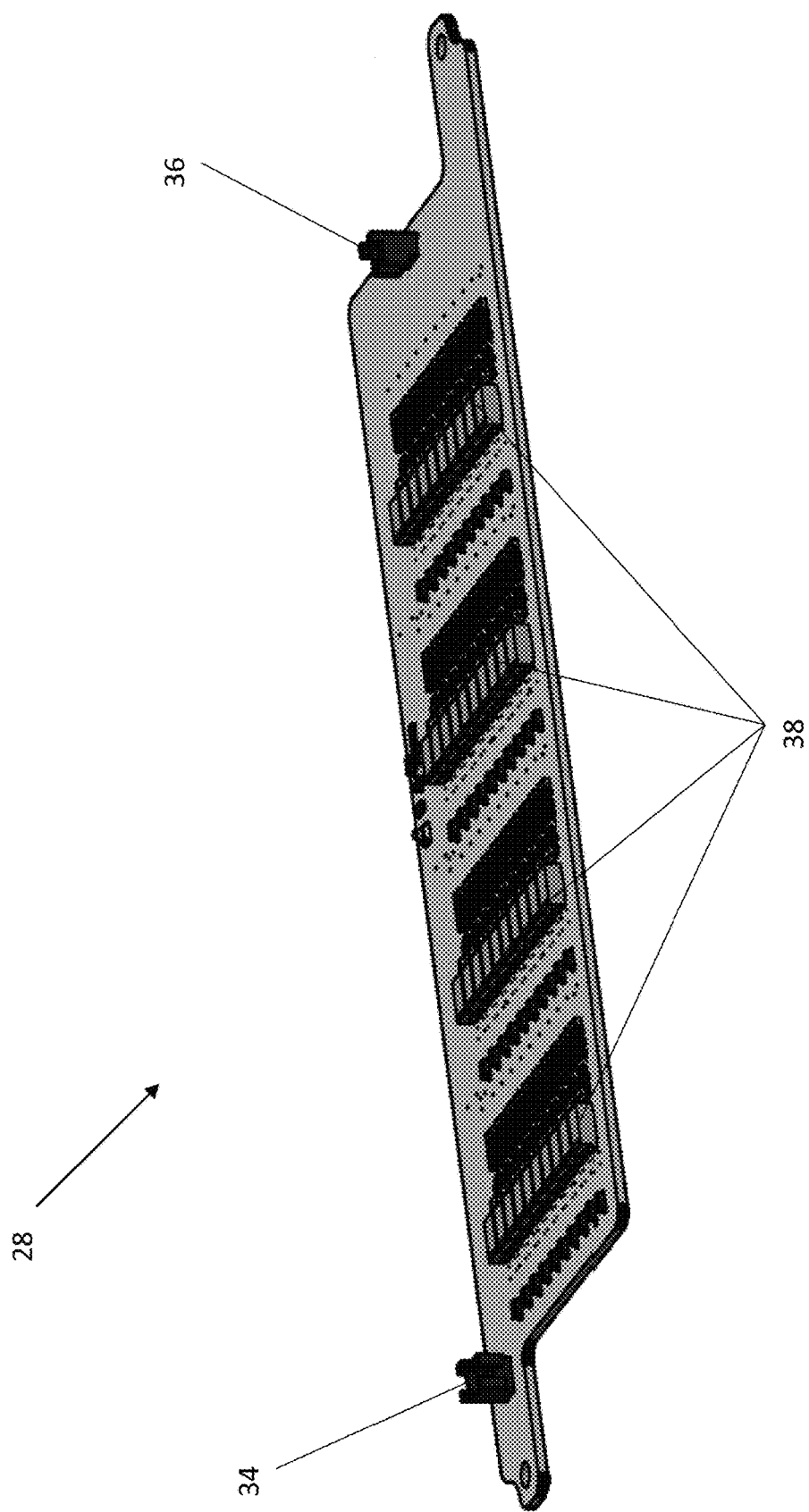
FIG. 3 is a perspective view of a circuit board according to an exemplary embodiment.

As further seen in FIG. 3, the circuit board 28 may include a plurality of electronic initiation circuits (EICs) 38. In a wellbore application, a tool string comprising a plurality of perforation guns may be lowered into a wellbore. Each perforating gun may include an EIC 38 configured to control detonation of the perforating gun. The EICs 38 in a tool string may be serially connected via wires and/or other types of electrical connectors between each of the perforating guns. In the electronic initiation system 10, the plurality of EICs 38 may be serially arranged via connections on the circuit board 28 such that the electrical connections in the electronic initiation system 10 are substantially similar to the electrical connections in the wellbore tool string. A total of N EICs may be included on the circuit board 28, N being a positive integer. The value of N may be set to whatever number of EICs 38 is desired to be provided within the circuit board. In one exemplary application, there may be forty (40) EICs 38 provided on the circuit board 28. However, it will be understood that the circuit board 28 is not limited to this embodiment, and that any positive integer may be used for the total number of EICs 38 provided on the circuit board 28.

Figure 4:
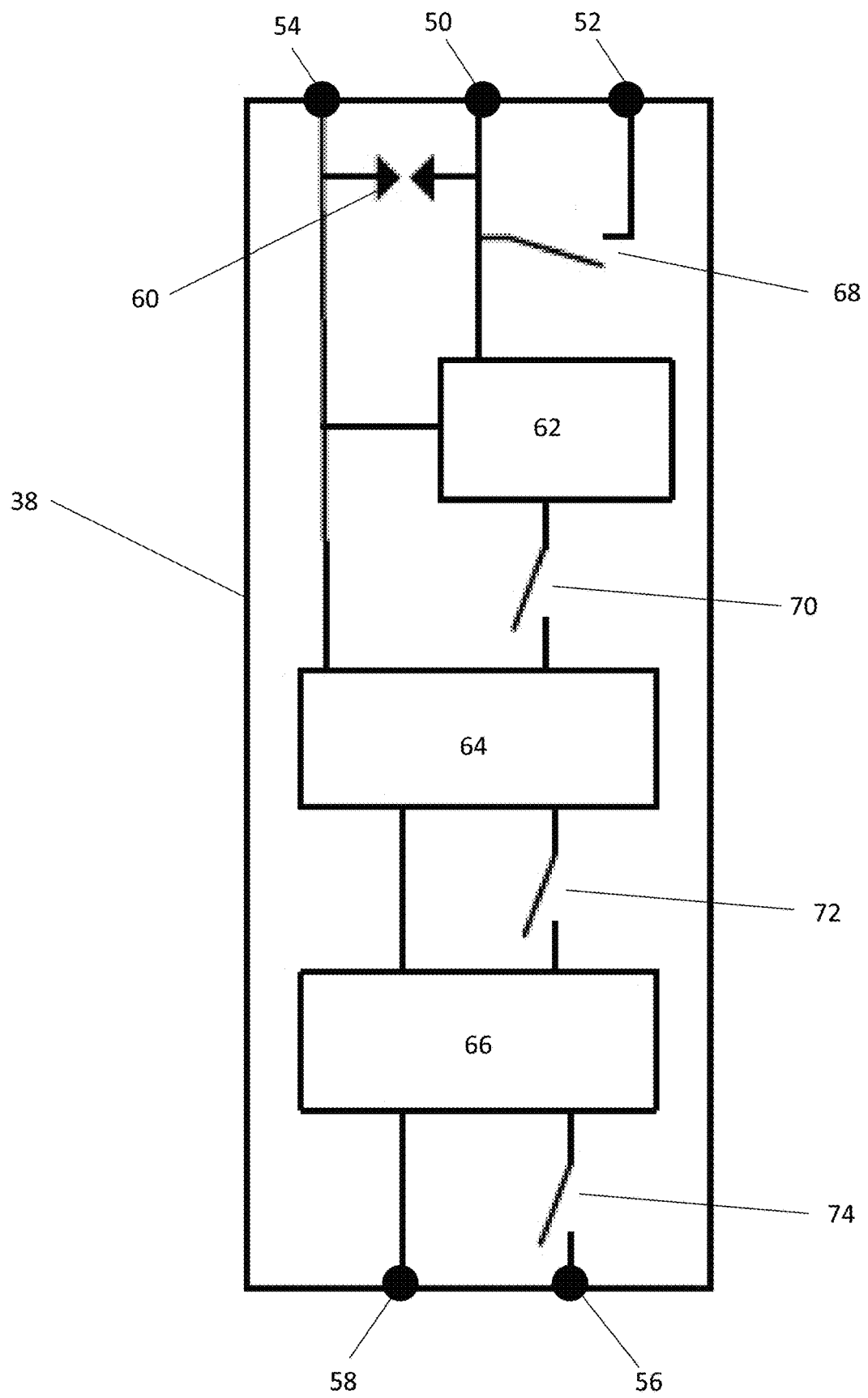
FIG. 4 is a block diagram of an electronic initiation circuit according to an exemplary embodiment.

FIG. 4 shows a block diagram of an exemplary embodiment of an EIC 38. The EIC 38 may include an EIC signal-in terminal 50, an EIC signal-out terminal 52, an EIC ground terminal 54, an EIC positive output terminal 56, and an EIC negative output terminal 58. In an exemplary embodiment, the EIC negative output terminal 58 may have a voltage substantially equal to a voltage at the EIC ground terminal 54. However, it will be understood that the EIC 38 is not limited to this embodiment, and that the voltage that the EIC negative output terminal 58 may be different from a ground voltage.

As further seen in FIG. 4, the EIC 38 may include an electromagnetic compatibility (EMC) component 60, a logic circuit 62, an RF-Safe circuit 64, a firing circuit 66, a first switch 68, a second switch 70, a third switch 72, and a fourth switch 74. The EMC component 60 may be operably coupled between the EIC signal-in terminal 50 and the EIC ground terminal 54, and may be configured to protect the EIC 38 from electromagnetic interference so that the EIC 38 may satisfy applicable EIC and electrostatic discharge (ESD) standards. The logic circuit 62 may be configured to control the first switch 68, the second switch 70, the third switch 72, and the fourth switch 74 based on a signal received at the EIC signal-in terminal 50, as described in further detail herein. The RF-Safe circuit 64 may be configured to isolate the firing circuit 66 from power until a signal to arm the firing circuit 66 is received. Additionally, the RF-Safe circuit 64 may further be configured to isolate the firing circuit 66 from RF interference so as to prevent unintentional arming and/or firing of the firing circuit 66. The firing circuit 66 may include a capacitor and a charging circuit configured to charge the capacitor. Upon receipt of the proper signal or sequence of signals, the logic circuit 62 may control the firing circuit 66 to discharge the energy stored in the capacitor. In the EIC 38 shown in FIG. 4, the output of the firing circuit 66 is output from the EIC positive output terminal 56 and the EIC negative output terminal 58 and is used in generating the indication from indicator 26. In a wellbore application, the discharged energy from the capacitor would be used to generate a spark to ignite and/or detonate a fuse, primary explosive, detonator cord, or the like in order to activate the perforation gun.

Figure 5:
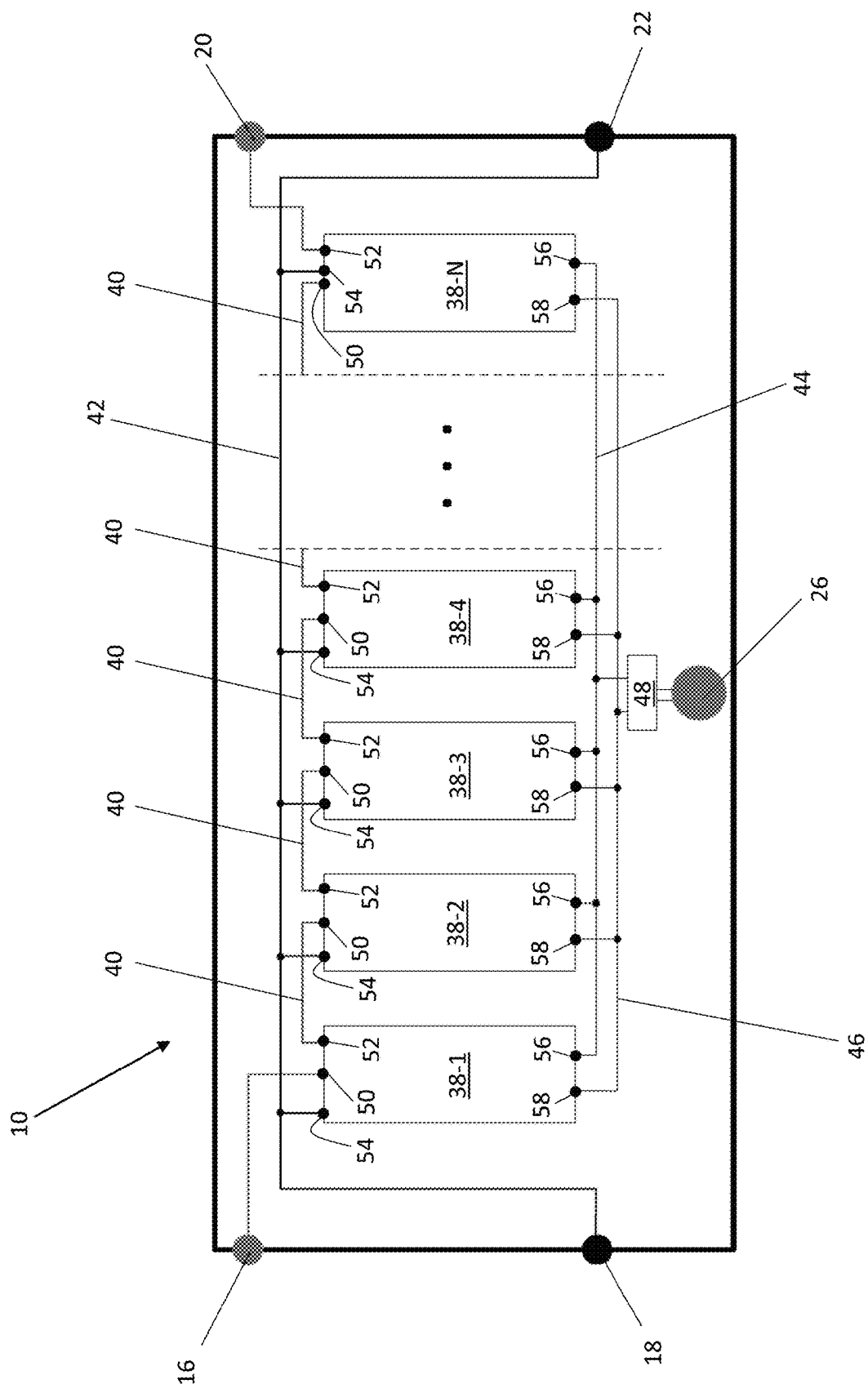
FIG. 5 is a block diagram of an electronic initiation system according to an exemplary embodiment.

FIG. 5 shows a block diagram schematically illustrating the circuitry inside the electronic initiation system 10. As noted above, the electronic initiation system 10 may include a plurality of EICs 38, such as a first EIC 38-1, a second EIC 38-2, a third EIC 38-3, a fourth EIC 38-4, and so on up to an Nth EIC 38-N. The first ground connector 18 and the second ground connector 22 may be operably coupled to the EIC ground terminal 54 of each of the plurality of EICs 38. The signal-in connector 16 may be operably coupled to the EIC signal-in terminal 50 of the first EIC 38-1. The EIC signal-out terminal 52 of each EIC 38 may be operably coupled to the EIC signal-in terminal 50 of a sequentially next EIC 38, such as via signal lines 40 or other suitable means. For example, as seen in FIG. 5, the EIC signal-out terminal 52 of the first EIC 38-1 is coupled to the EIC signal-in terminal of the second EIC 38-2, the EIC signal-out terminal 52 of the second EIC 38-2 is coupled to the EIC signal-in terminal of the third EIC 38-3, etc. The EIC signal-out terminal 52 of the Nth EIC 38-N may be operably coupled to the signal-out connector 20 of the electronic initiation system 10.

As further seen in FIG. 5, the EIC positive output terminal 56 of each EIC 38 may be operably coupled to a positive output line 44, and the EIC negative output terminal 58 of each EIC may be operably coupled to a negative output line 46. The electronic initiation system 10 may further include a minimum voltage circuit 48 that evaluates the voltage difference between the positive output line 44 and the negative output line 46. The minimum voltage circuit 46 may be configured such that, in response to the voltage difference between the positive output line 44 and the negative output line 46 being larger than a predetermined threshold, the minimum voltage circuit 46 activates the indicator 26. In an exemplary embodiment in which the indicator 26 is an LED, the minimum voltage circuit 46 may illuminate the LED. Alternatively, in an exemplary embodiment in which the indicator 26 is a speaker, the minimum voltage circuit 48 may control the speaker to emit a sound. The predetermined threshold may be selected to be substantially equal to the voltage necessary to initiate a perforation gun. In other words, if the output of an EIC 38 is sufficient to generate an indication at indicator 26, then the output of that EIC 38 is sufficient to initiate a perforation gun. Thus, by using the electronic initiation system 10, a user may be able to confirm sufficient firing energy for a wellbore tool string including a desired number of EICs 38.

Figure 6:
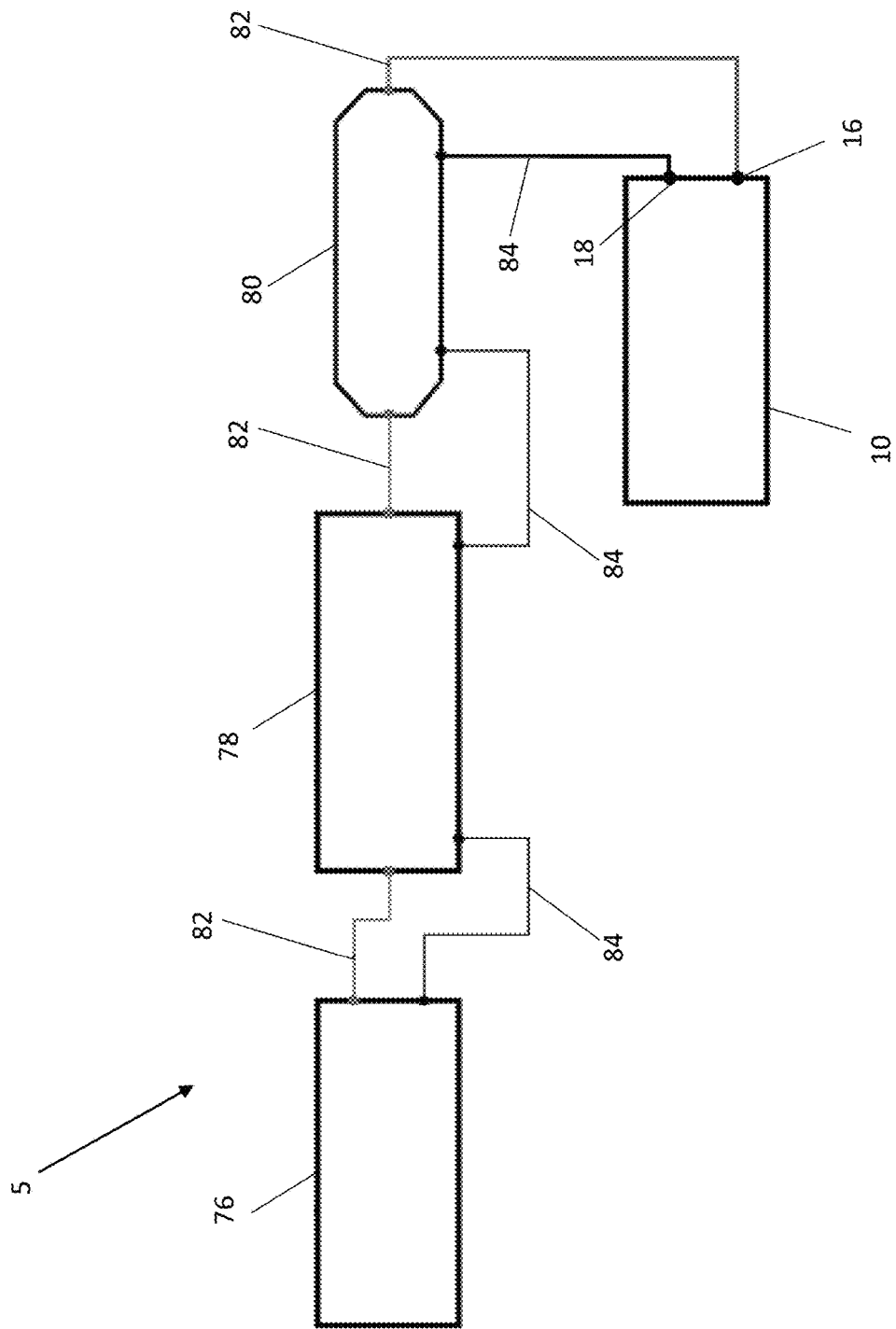
FIG. 6 is a block diagram of a simulation system according to an exemplary embodiment.

In an exemplary embodiment when using the electronic initiation system 10 as a simulator of the electronics in a wellbore tool-string, the electronic initiation system may be used with other devices and components that are typically used with a wellbore tool string. For example, FIG. 6 shows a block diagram of an exemplary embodiment of a simulation system 5 that may include a firing panel 76, a wireline 78, a case collar locator 80, and the electronic initiation system 10. The firing panel 76 may include user interface components such as buttons, switches, touch screens, and other suitable controls. Additionally, the firing panel 76 may include display components such as LEDs, display screens, analog meters, and other suitable components for providing information to the user. Further details of the operation of the firing panel 76 in conjunction with the electronic initiation system 10 are discussed herein. The wireline 78 and the case collar locator 80 may be operably coupled to the firing panel via signal wires 82 and ground wires 84. Signal wire 84 may be operably coupled to the signal-in connector 16 of the electronic initiation system 10, such that a signal output by the firing panel 76 is carried through the wireline 78 and the case collar locator 80 and received at the electronic initiation system 10.

In an exemplary embodiment, a user may have a desired EIC in mind to be tested. For example, if the user plans to run a tool string having N perforating guns, the user may desire to test the output of the Nth EIC in the electronic initiation system 10. The firing panel 76 may be configured to selectively choose which EIC 38 of the plurality of EICs 38 is active for receiving a signal. If the active EIC 38 is not the desired EIC 38, then the firing panel 76 may send a signal to the logic circuit 62 (see FIG. 4) of the EIC 38, and the logic circuit 62 may control the EIC 38 so as to pass along the signal from the firing panel 76 to the next sequential EIC 38. This process may be repeated until the desired EIC 38 is active. The firing panel 76 may be further configured to send further commands, such as a confirmation command, an arming command, and a firing command. Once the desired EIC 38 is active, confirmed, and armed, the firing command causes the logic circuit 62 to control the firing circuit 66 to discharge the capacitor. The minimum voltage circuit 48 (see FIG. 5) may then evaluate the output voltage of the capacitor to determine whether the output exceeds the predetermined threshold and control the indicator 26 accordingly, as discussed above. In this way, the EICs 38 of the electronic initiation system 10 are configured to be selectively activated by the firing panel 76.

Figure 7:
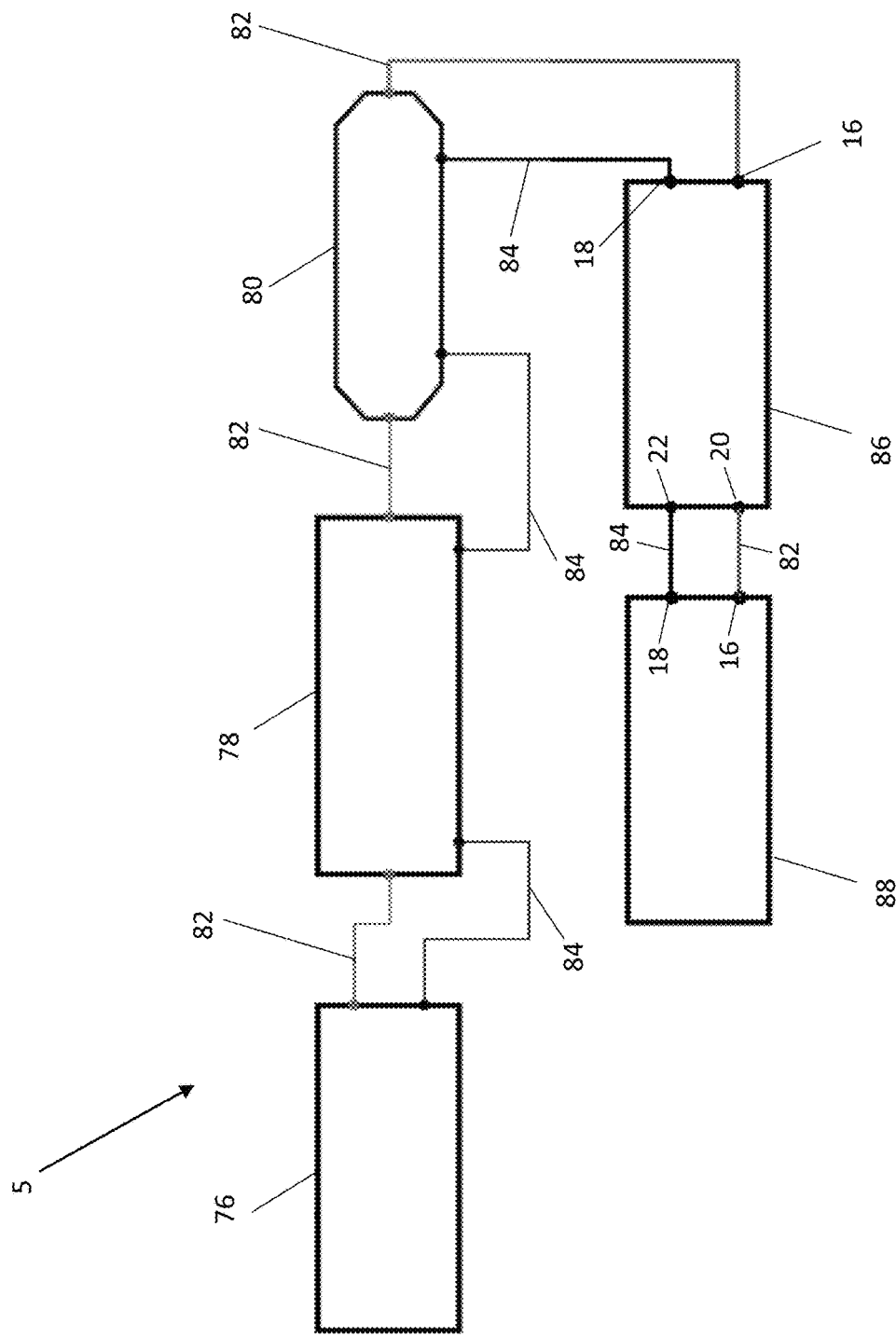
FIG. 7 is a block diagram of a simulation system according to an exemplary embodiment.

In some applications, it may be impractical to fit the desired number of EICs 38 within a single electronic initiation system 10 due to size constraints. Accordingly, FIG. 7 shows a block diagram of an exemplary embodiment of a simulation system 5 in which a first electronic initiation system 86 and a second electronic initiation system 88 are coupled together. The first electronic initiation system 86 and the second electronic initiation system 88 are substantially identical to the electronic initiation system 10, except that the number of EICs 38 within each system may vary. As further seen in FIG. 7, the signal-out connector 20 of the first electronic initiation system 86 may be operably coupled to the signal-in connector 16 of the second electronic initiation system 88 via a signal wire 82. Similarly, the second ground connector 22 of the first electronic initiation system 86 may be operably coupled to the first ground connector 18 of the second electronic initiation system 88. In this way, the system 5 may be scalable to incorporate any desired number of EICs 38 by coupling multiple electronic initiation systems together.

Figure 8:
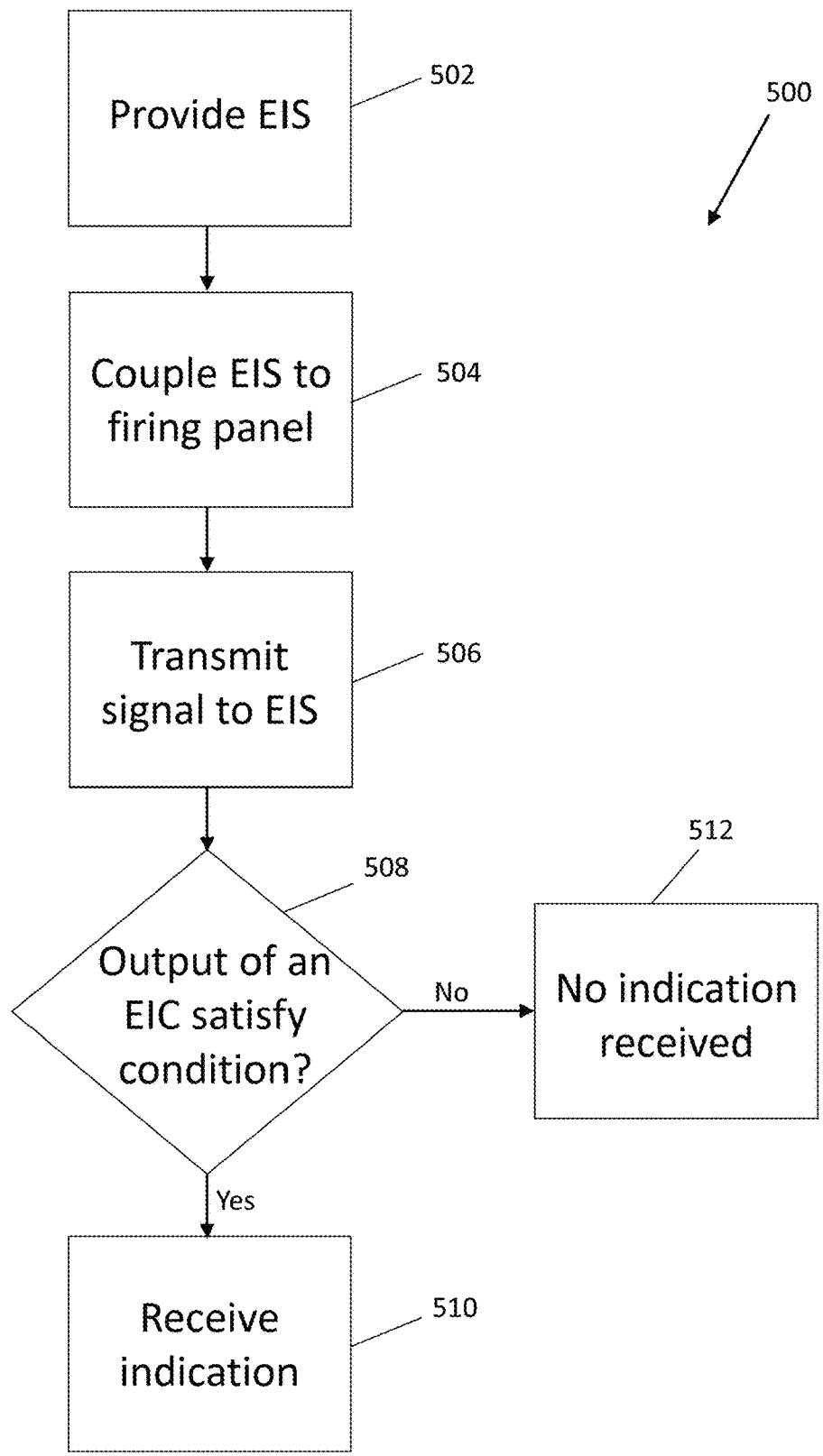
FIG. 8 is a block diagram of a method according to an exemplary embodiment.

FIG. 8 illustrates an exemplary method 500 for controlling electronic initiation using an electronic initiation system 10. In block 502, an electronic initiation system (EIS) is provided. The EIS may be the electronic initiation system 10 as described above with reference to FIGS. 1-5, and it may include a plurality of EICs 10. In block 504, the EIS is coupled to a firing panel, such as the firing panel 76 as described above with reference to FIGS. 6-7. The output of the firing panel 76 is operably coupled to the signal-in connector 16 of the electronic initiation system 10. In block 506, the firing panel 76 is controlled to send a signal to the electronic initiation system 10. For example, the firing panel 76 may send a firing signal to a selected EIC 38 of the plurality of EICs 38. In block 508, it is determined whether the output of one of the EICs 38, such as an EIC 38 selected by the firing panel, of the electronic initiation system 10 satisfies a predetermined condition. As explained above, the predetermined condition may be a predetermined threshold voltage. If the output of an EIC does satisfy the predetermined condition (i.e., "yes" at block 508), then the method proceeds to block 510. If the output of the EIC does not satisfy the predetermined condition (i.e., "no" at block 508), then the method proceeds to block 512. In block 510, if the predetermined condition is satisfied, a signal is received from the electronic initiation system. The signal may be an electronic signal, such as a voltage or a current of a certain level or encoding certain information. Alternatively, the signal may be a visual signal, such as an illuminated LED. Alternatively, the signal may be an audio signal, such as a sound or pattern of sounds.

Further exemplary embodiments of an EIC are described below with reference to FIGS. 9 through 18.

Figure 9:
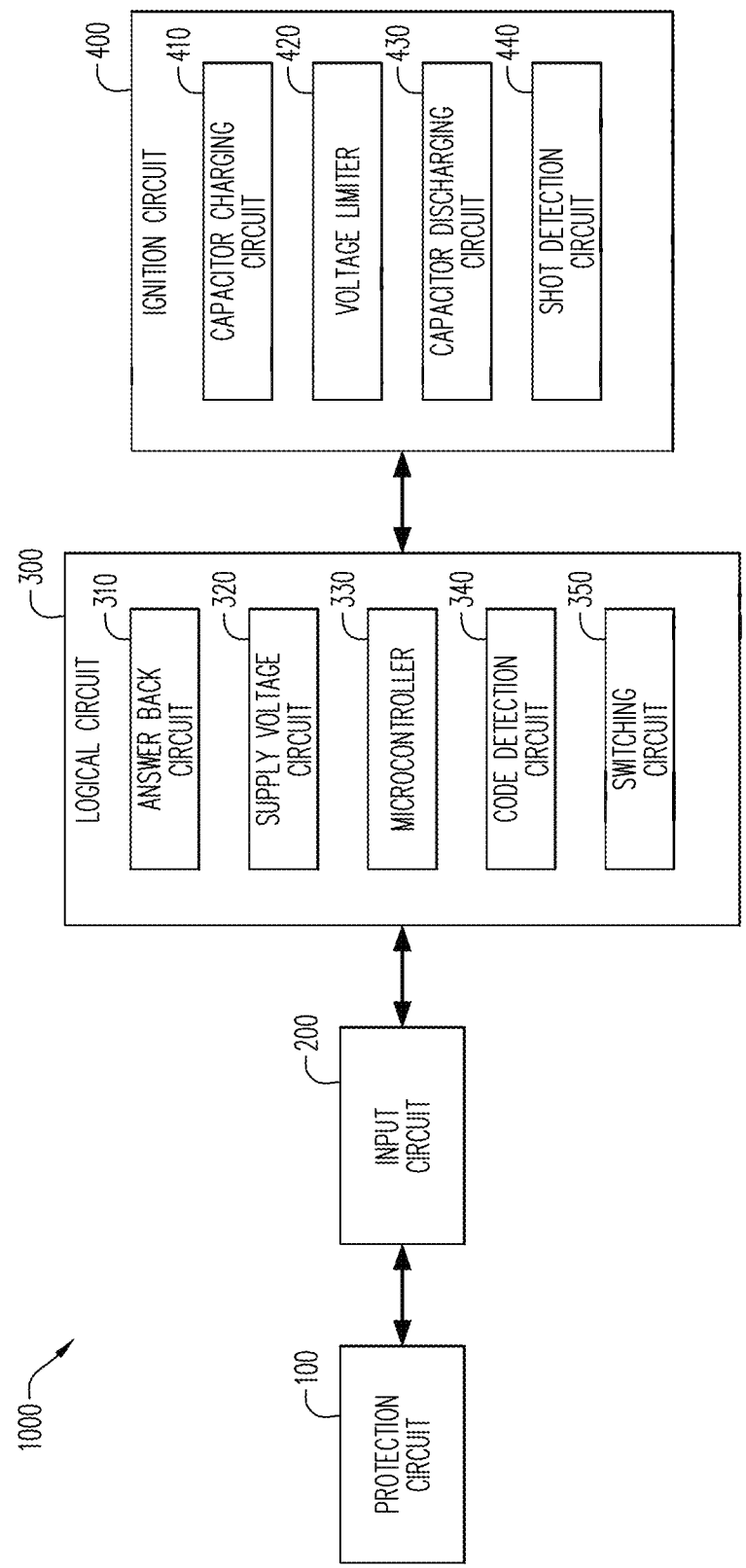
FIG. 9 is a block diagram of an exemplary embodiment of an electronic initiation circuit for controlling at least one detonator, according to an exemplary embodiment.
Figure 13:
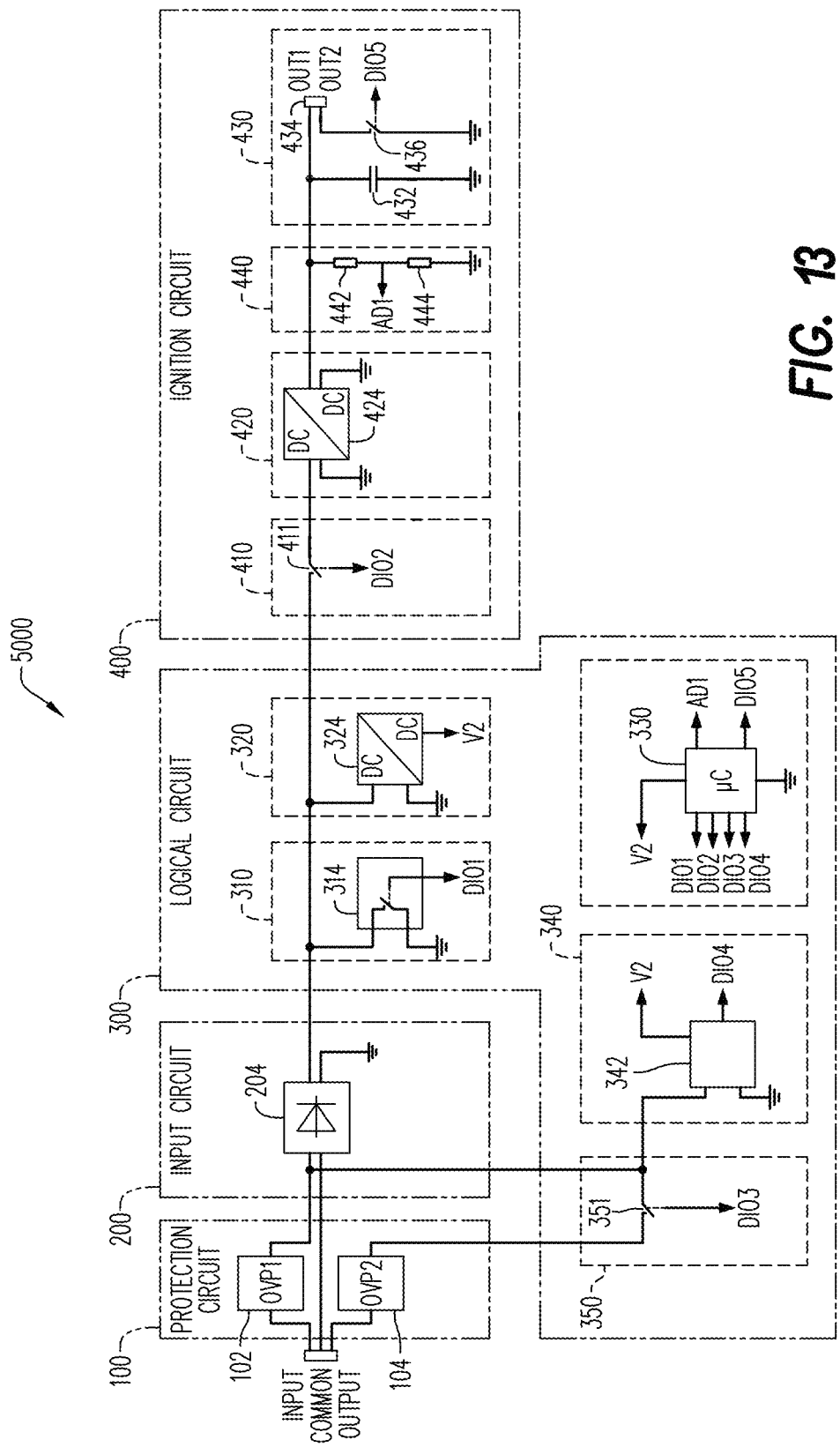
FIG. 13 is a schematic diagram of an electronic initiation circuit for controlling at least one detonator, according to an exemplary embodiment.

Referring to FIG. 9, a block diagram of an exemplary embodiment of an EIC 1000 for controlling at least one detonator 8000 (see, for instance, FIGS. 16A and 16B), according to the present disclosure, is shown. In some embodiments, the EIC 1000 includes a protection circuit 100, an input circuit 200, a logical circuit 300 and an ignition circuit 400. The protection circuit 100 includes an input terminal, an output terminal and a common (com) terminal, as shown in FIG. 13, electrically connected to the input line, the output line and the common line, respectively. Returning to FIG. 9, the protection circuit 100 protects the EIC 1000 from excessive transient voltages beyond a predefined maximum, such as voltage spikes, that could otherwise cause damaging currents in the EIC. In some embodiments, the protection circuit 100 includes at least one or more of varistors and/or suppressor diodes to protect against excessive transient voltages by shunting the current created by excessive voltages away from other circuits in the EIC 1000.

The input circuit 200 is electrically connected to the protection circuit 100. The input circuit receives electrical power from the protection circuit and exchanges communications signals with surface equipment. The input circuit 200 includes a bridge rectifier. Returning to FIG. 9, the input circuit 200 exchanges signals with the logical circuit 300.

The logical circuit 300 is electrically connected between the input circuit 200 and the ignition circuit 400. The logical circuit 300 receives electrical power from the protection circuit and exchanges communications signals with surface equipment through the input circuit 200. In some embodiments, the logical circuit 300 includes an answer back circuit 310, a supply voltage circuit 320, a microcontroller 330, a code detection circuit 340 and a switching circuit 350. In general, the answer back circuit 310 provides a signal output back to the surface equipment to indicate a result of a command or test. For example, in some embodiments, the EIC receives four (4) codes each having a different combination of signals of eight (8) coded bits (one byte). In some embodiments, the four codes are designated as Code A, Code B, Code C and Code D, respectively, and each have a different function in the EIC 1000. In some embodiments, at a valid reception of Code B, the microcontroller 330 switches a resistor in the answer back circuit 310 to increase the current flow for answer back to surface equipment in communication with the EIC 1000. In some embodiments, the supply voltage circuit 320 converts voltages from the protection circuit 100 and input circuit 200 to voltage levels acceptable to the logical circuit 300. In some embodiments, the microcontroller 330 exchanges signals, such as Codes A-D, with surface equipment to control detonation as described herein. In some embodiments, the code detection circuit 340 detects and distinguishes between each of the Codes A-D. The microcontroller 330 may be programmed to detect the codes from the code detection circuit 340. In some embodiments, the switching circuit 350 increases current on the input line to be compatible with previous perforation systems.

The ignition circuit 400 is electrically connected to the logical circuit 300. The ignition circuit 400 is controlled by the logical circuit 300 to store electrical energy and cause ignition of an explosive substance in a perforation gun (not shown). In some embodiments, the ignition circuit 400 includes a capacitor charging circuit 410, a voltage limiter 420, a capacitor discharging circuit 430 and a shot detection circuit 440. In some embodiments, the microcontroller 330 causes the capacitor charging circuit 410 to begin charging a firing capacitor used to caused detonation in response to receipt of Code C, as described herein. In some embodiments, the voltage limiter 420 includes a Zener diode to limit voltage applied to the capacitor charging circuit 410 to protect the capacitor at high temperatures often found underground. In some embodiments, the capacitor discharging circuit 430 controls the ignition of a detonator. In some embodiments, the detonator includes an electrically-initiated fuse head. In some embodiments, the shot detection circuit 440 detects detonation of an explosive substance caused by the electrically-initiated fuse head. The shot detection circuit 440 includes an integrated shot detection feature. A measurement is made of a voltage across the firing capacitor shortly before and shortly after the fuse head is ignited to determine whether a correct discharge took place. According to an aspect, the shot detection circuit 440 is active after discharging the firing capacitor. If the measured voltage is in the expected pre-ignition range shortly before the fuse head is ignited and in the expected post-ignition range shortly after the fuse head is ignited, the shot detection circuit 440 generates a result signal indicating that a proper detonation occurred; otherwise, the shot detection circuit generates a result signal indicating that a proper detonation has not occurred. The result signal (used to define a result variable) from the shot detection circuit 440 is transmitted via the answer back circuit 310 to the surface equipment. Because the shot detection circuit 440 measures voltage across the firing capacitor both shortly before and shortly after the fuse head is ignited, the accuracy of the result signal is improved, thereby enabling better control of the perforation system because ignition is known with greater accuracy and precision. Better control of the perforation system also enables longer wirelines to be advantageously deployed.

Figure 10:
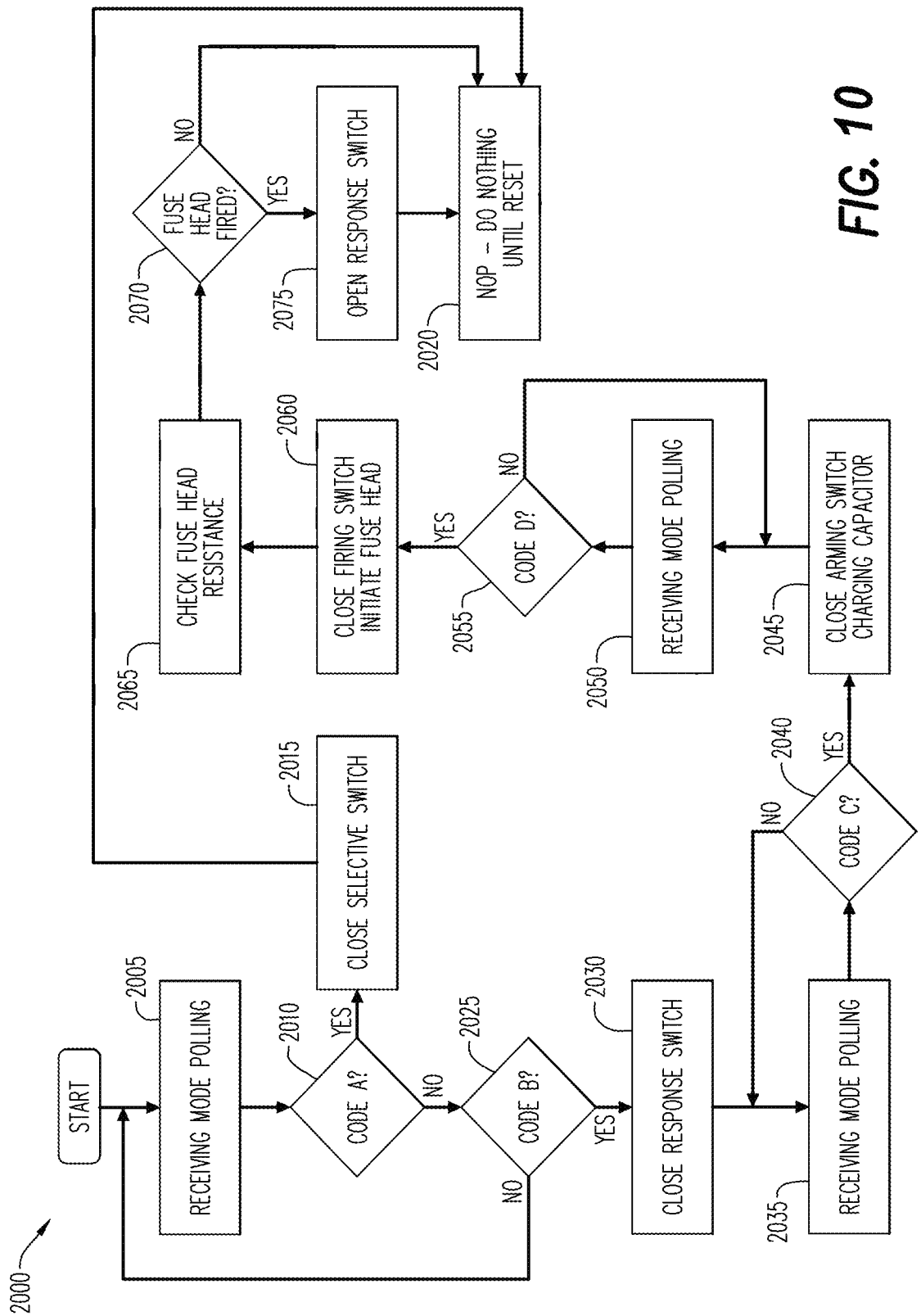
FIG. 10 is a flowchart of an exemplary embodiment of the electronic initiation circuit of FIG. 9 for controlling at least one detonator, according to an exemplary embodiment.

Referring to FIG. 10, a flowchart of the EIC 1000 of FIG. 9 for controlling 2000 at least one detonator, according to the present disclosure, is shown. In step 2005 the microcontroller 330 in the EIC 1000 begins polling for codes received from the surface equipment. In some embodiments, the four (4) codes recognized by the EIC 1000 include: Code A for incrementing control to a next perforating gun; Code B for activation causing the microcontroller 330 to increase the current flow for answer back to surface equipment in communication with the EIC 1000; Code C for arming the ignition circuit 400 electrically coupled to the current perforating gun; and Code D for firing a current perforating gun with the ignition circuit 400. In some embodiments, Codes A-D are described as particular two-digit hexadecimal bits corresponding to the 8 bits in the code such that none of the hexadecimal bits are repeated in any of Codes A-D.

In step 2010 the EIC 1000 determines if Code A was received. If Code A was received, in step 2015, the EIC 1000 closes a selective switch, then in step 2020 the EIC performs no operation (NOP) and does nothing further until the microcontroller 330 in the EIC is reset. Alternatively, if Code A is not detected, then in step 2025 the EIC 1000 determines if Code B was received. If Code B was not received, the EIC 1000 continues polling in step 2005; if Code B was received, the EIC closes a response switch in step 2030 and begins receiving mode polling in step 2035. In step 2040, the EIC 1000 determines whether Code C is received, indicating that the EIC is being instructed to arm and charge the firing capacitor. If Code C is not received in step 2040, the EIC 1000 continues polling in step 2035; if Code C is received in step 2040, the EIC closes the arming switch charging capacitor in step 2045 and enters receiving mode polling in step 2050.

In step 2055, the EIC 1000 determines whether Code D is received, indicating that the EIC is being instructed to fire and discharge the firing capacitor. If Code D is not received in step 2055, the EIC 1000 continues polling in step 2050, if Code D is received in step 2055, the EIC proceeds to step 2060. According to an aspect, a firing transistor is used to discharge the firing switch through the fuse head. The firing transistor may remain active closed after the discharge of the firing capacitor through the fuse head.

In step 2060, the EIC 1000 applies a voltage across the firing capacitor shortly before the fuse head is ignited, the firing switch is then closed to initiate the fuse head causing ignition of the explosive substance, and shortly after the fuse head is ignited the EIC 1000 again applies a voltage across the firing capacitor to determine whether a correct discharge took place. If the correct discharge took place, the fuse head is destroyed. According to an aspect, at least three measured voltages are used to set a result variable representing one of a successful shot, and a failed shot. In an embodiment, the shot detection circuit 440 in the EIC 1000 measures voltage across the firing capacitor in step 2060 shortly before the fuse head is ignited and in step 2065 shortly after the fuse head is ignited to determine whether a correct discharge took place. In step 2070, if the measured voltage from step 2060 is in the expected pre-ignition range shortly before the fuse head is ignited and the measured voltage from step 2065 is in the expected post-ignition range shortly after the fuse head is ignited, then in step 2075, the response switch is opened and the shot detection circuit 440 generates a result signal indicating that a proper ignition occurred and proceeds to step 2020, otherwise, the shot detection circuit generates a result signal indicating that a proper ignition has not occurred and also proceeds to step 2020.

Figure 11:
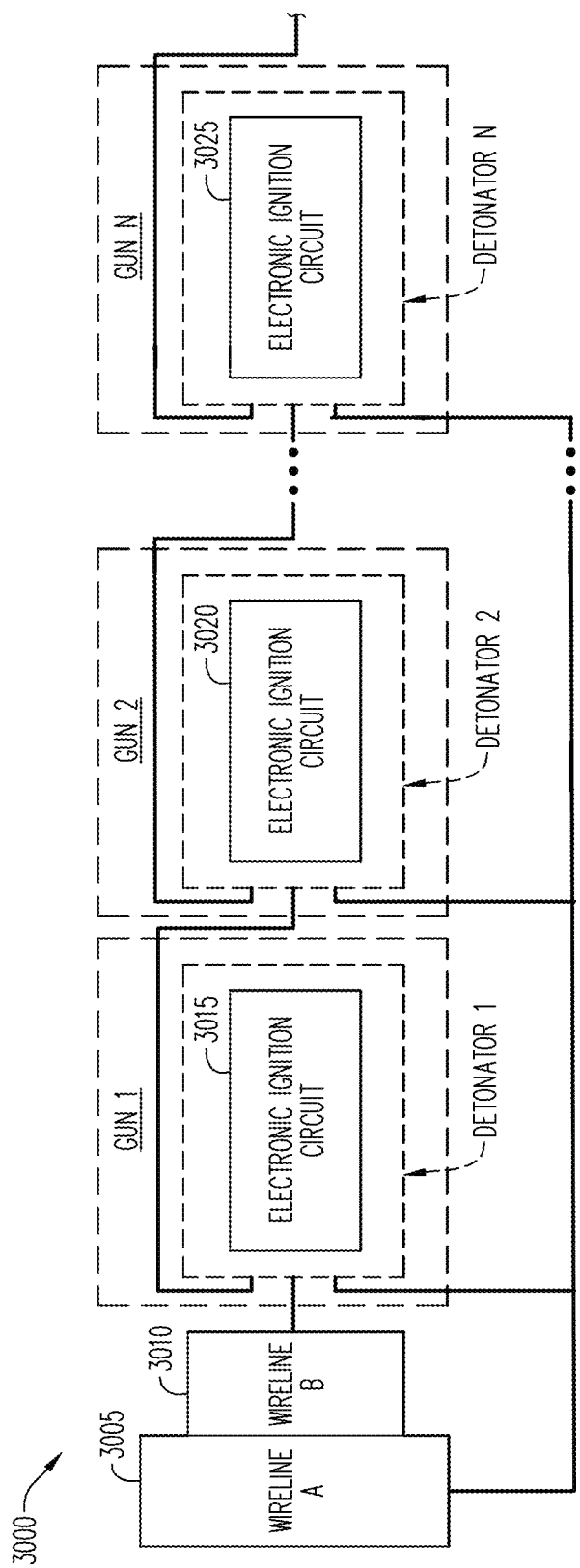
FIG. 11 is a block diagram of an exemplary embodiment having a plurality N of electronic initiation circuit each for controlling at least one detonator, according to an exemplary embodiment.

Referring to FIG. 11, a block diagram of an exemplary embodiment having a plurality N of detonators with EIC each for controlling at least one detonator 3000, according to the present disclosure, is shown. In FIG. 11, each perforation gun is represented by a dashed line box that includes a separate detonator with EIC 1000. More specifically, Gun 1 includes a detonator with EIC 3015, Gun 2 includes a detonator with EIC 3020, Gun N includes a detonator with EIC 3025. Gun 1, Gun 2 and Gun N each represent sequentially connected perforation guns wherein N is a whole number integer. In some embodiments, N is a whole number integer greater than or equal to two. Each perforation gun is connected in parallel to Wireline A 3005. Each perforation gun is connected in series to Wireline B 3010 such that Wireline B is electrically connected to EIC 3015, which is connected to EIC 3020, which is electrically connected to EIC 3025 and so forth.

Figure 12:
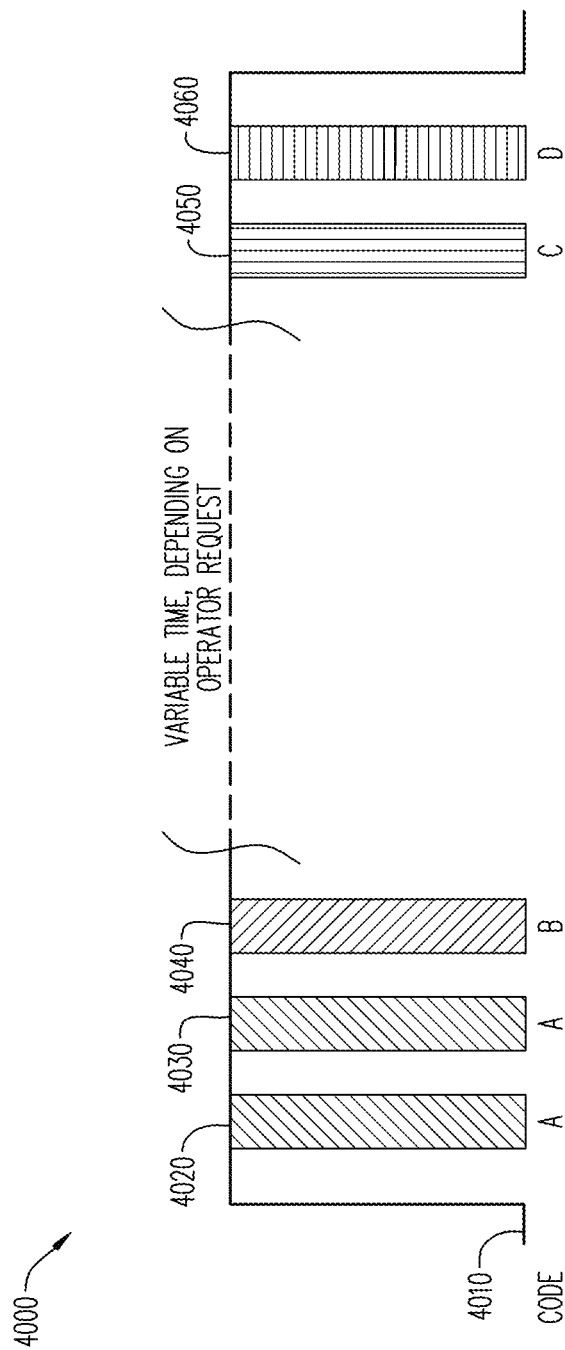
FIG. 12 is a timing diagram of an exemplary embodiment of an electronic initiation circuit for controlling at least one detonator, according to an exemplary embodiment.

Referring to FIG. 12, a timing diagram of an exemplary embodiment of an EIC for controlling at least one detonator 4000, according to the present disclosure, is shown. In one embodiment, a timeline 4010 including communications between transmitting and receiving surface equipment controlled by an operator and an EIC 1000 is shown. During the timeline 4010, a first Code A 4020 and a second Code A 4030 is transmitted by the surface equipment and received by the EIC 1000, causing a third EIC in a chain of N EICs to be selected. Code B 4040 is transmitted by the surface equipment and received by the EIC 1000, causing the EIC to respond as described with regard to FIG. 10. Returning to FIG. 12, in some embodiments, a variable amount of time between transmission of Code B and Code C is dependent at least in part on operator request. At some variable point along the timeline 4010, Code C 4050 is transmitted by the surface equipment and received by the EIC 1000, causing the EIC to become armed. After Code C 4050 is received, Code D is transmitted by the surface equipment and received by the EIC 1000, causing the EIC to fire the perforation gun by igniting the fuse head to detonate the explosive substance.

Referring to FIG. 13, a diagram of the EIC for controlling at least one detonator (not shown), according to the present disclosure, is shown. The EIC 5000 includes protection circuit 100. Note that as described herein, components with identical reference numbers in different figures, such as those shown in FIG. 9 and in FIG. 13 are intended to describe the same component. Similarly, where different reference numbers are used in different figures, such as the EIC 1000 and EIC 5000 in FIG. 9 and FIG. 13, respectively, such numbering is intended to describe alternative embodiments. For example, protection circuit 100 in FIG. 9 is also illustrated here in FIG. 13 as protection circuit 100. The protection circuit 100 includes an over voltage protection at an input 102 electrically connected to an over voltage varistor at an output 104. While not shown, it is contemplated herein that at least one or more of a varistor and/or a suppressor diode may be used at an input, and at least one or more of a varistor and/or a suppressor diode may be used at an output. The EIC 5000 includes input circuit 200. The input circuit 200 includes a bridge rectifier.

The EIC 5000 includes logical circuit 300. The logical circuit 300 includes an answer back circuit 310, which includes a switch 314. The logical circuit 300 includes a supply voltage circuit 320, with a DC/DC converter 324. The logical circuit 300 also includes a microcontroller 330 with an internal or external A/D converter. The logical circuit 300 further includes a code detection circuit 340, with a signal coupling circuit 342, which couples the signal to the microcontroller 330. The logical circuit 300 still further includes a switching circuit 350, which includes at least a switch 351 to the output.

The EIC 5000 includes ignition circuit 400. The ignition circuit 400 includes a release of capacitor charging circuit 410, which includes at least an arm switch 411. The ignition circuit 400 also includes a voltage limiter for firing capacitor circuit 420, which includes a DC/DC converter with a current limitation 424. The ignition circuit 400 further includes a capacitor discharge circuit 430, which includes a firing capacitor 432, a fuse head (detonator) 434, and an ignition switch 436. The ignition circuit 400 still further includes a shot detection circuit 440, which includes two resistors 442 and 444 connected as a voltage divider to measure the capacitor voltage.

Figure 14:
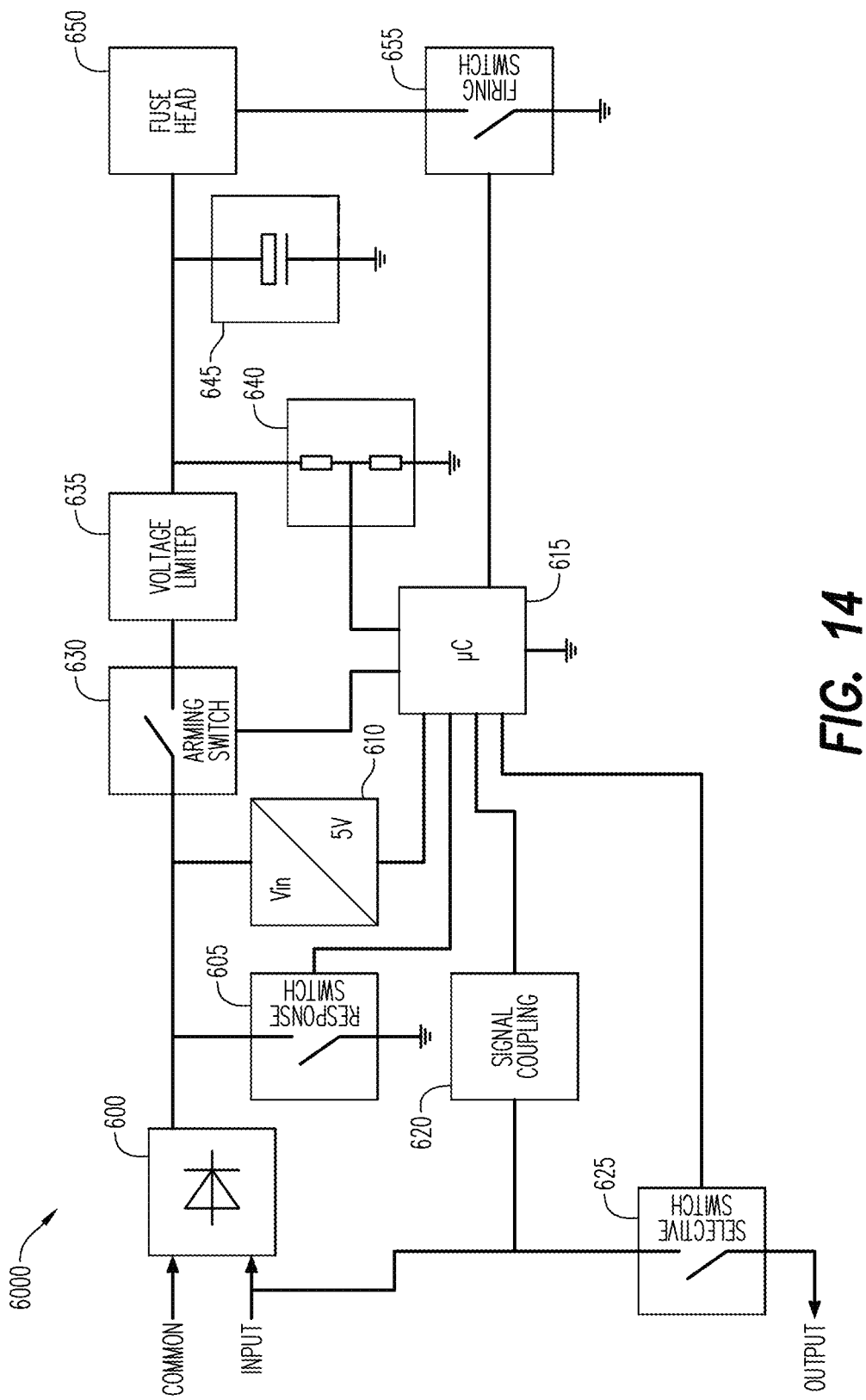
FIG. 14 is a block diagram of an electronic initiation circuit for controlling at least one detonator, according to an exemplary embodiment.

Referring to FIG. 14, a block diagram of an exemplary embodiment of an EIC for controlling at least one detonator 6000, according to the present disclosure, is shown. The input circuit 600 is electrically coupled to the input line and the common line. In some embodiments, the EIC 6000 includes an answer back circuit 605, a supply voltage circuit 610, a microcontroller 615 and a code detection circuit 620 for signal coupling and a switching circuit 625. The answer back circuit 605 may indicate the result of a shot detection. In some embodiments, the EIC 6000 also includes an arming switch 630. The arming switch 630 may be active closed to charge the firing capacitor after receiving an arming code, and until it receives and reacts to a firing code. The arming switch 630 may be active again after a time delay that occurs after the discharging of the firing capacitor through the fuse head, in order to recharge the firing capacitor after ignition of the fuse head. The EIC 600 may additionally include a voltage limiter circuit 635, a firing capacitor 645, a fuse head (detonator) 650, a firing switch 655, and a shot detection circuit 640. The shot detection circuit 640 may be adapted to measure a voltage across the firing capacitor 645 before discharging through the fuse head 650, and to measure the voltage after discharging through the fuse head 650. According to an aspect, the shot detection circuit 640 measures the voltage across the firing capacitor 645 before the discharging of the firing capacitor 645, after the discharging of the firing capacitor 645, and/or after the recharging of the firing capacitor 645. According to an aspect, the shot detection circuit 640 may be active again after discharging the firing capacitor 645.

Referring to FIG. 15A, a timing diagram of an exemplary embodiment of an EIC for controlling at least one detonator 7000, according to the present disclosure, is shown. The timing diagram represents a coded bit exemplar of the eight bit code of Codes A-D. The left side represents the coded bit logic "1", while the right side represents the coded bit logic "0" exemplar of the eight bit code of Codes A-D. In the coded bit logic "1" all high and low signal periods for transmitting digital bits in a code, such as code selected from Codes A-D, are substantially equal or greater than one millisecond. In the coded bit logic "0", the high signal period (duty cycle) is a holding factor multiplied by the high signal period used in the coded bit logic "1". In some embodiments, that holding factor is greater than 1.5. As shown in FIG. 15A, the holding factor is approximately 3, meaning the high signal period is held for three times longer in a coded bit logic "0" as opposed to a coded bit logic "1". The purpose of high and low signal periods greater than one milliseconds and of holding the high signal period longer in a coded bit logic "0" is to offset the longer time needed to raise the voltage in the long wireline due to increased capacitance. The purpose of the holding factor is to reduce the low signal periods to improve the voltage supply.

Referring to FIG. 15B, is an equation diagram of an exemplary embodiment of an EIC for controlling at least one detonator as shown in FIG. 15A, according to the present disclosure, is shown. All high and low signal periods for transmitting digital bits in a code, such as code selected from Codes A-D, are substantially equal and greater than one millisecond. In coded bit logic "0", the high signal period (duty cycle) is the holding factor multiplied by the high signal period used in coded bit logic "1". In some embodiments, that holding factor is greater than 1.5.

Referring to FIG. 16A, a cross-sectional side view of an exemplary embodiment of a detonator 8000 having an EIC for controlling the detonator, according to the present disclosure, is shown. The detonator 8000 includes an input connection 8010, an output connection 8020, a common connection 8030, an EIC 8040, a fuse head 8050, a primary charge 8060 and a secondary charge 8070.

Referring to FIB. 16B, a cross-sectional side view of an exemplary embodiment of a detonator 8100 having an EIC for controlling the detonator, according to the present disclosure, is shown. The detonator 8000 includes an input line (red) 8010, an output line (blue) 8020, a common line (black) 8030, an EIC 8040, a fuse head 8050, a primary charge 8060 and a secondary charge 8070.

Some embodiments herein describe an EIC for controlling at least one detonator, including a protection circuit, including at least one of a fuse, a circuit breaker and an automatic switch In an embodiment, the EIC further includes an input circuit electrically coupled to the protection circuit. The EIC may include a logical circuit electrically coupled to the input circuit, and including an answer back circuit, and a switching circuit adapted to switch to the next detonator or igniter. According to an aspect, the EIC includes an ignition circuit electrically coupled to the logical circuit. The ignition circuit may include a capacitor charging circuit, a capacitor discharge circuit to discharge a firing capacitor through the fuse head, and a shot detection circuit adapted to measure a voltage across the firing capacitor before discharging through the fuse head and to measure a voltage after discharging through the fuse head.

This disclosure, in various embodiments, configurations and aspects, includes components, methods, processes, systems, and/or apparatuses as depicted and described herein, including various embodiments, sub-combinations, and subsets thereof. This disclosure contemplates, in various embodiments, configurations and aspects, the actual or optional use or inclusion of, e.g., components or processes as may be well-known or understood in the art and consistent with this disclosure though not depicted and/or described herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that the appended claims should cover variations in the ranges except where this disclosure makes clear the use of a particular range in certain embodiments.

The terms "determine", "calculate" and "compute," and variations thereof, as used herein, are used interchangeably and include any type of methodology, process, mathematical operation or technique.

This disclosure is presented for purposes of illustration and description. This disclosure is not limited to the form or forms disclosed herein. In the Detailed Description of this disclosure, for example, various features of some exemplary embodiments are grouped together to representatively describe those and other contemplated embodiments, configurations, and aspects, to the extent that including in this disclosure a description of every potential embodiment, variant, and combination of features is not feasible. Thus, the features of the disclosed embodiments, configurations, and aspects may be combined in alternate embodiments, configurations, and aspects not expressly discussed above. For example, the features recited in the following claims lie in less than all features of a single disclosed embodiment, configuration, or aspect. Thus, the following claims are hereby incorporated into this Detailed Description, with each claim standing on its own as a separate embodiment of this disclosure.

Advances in science and technology may provide variations that are not necessarily express in the terminology of this disclosure although the claims would not necessarily exclude these variations.

What is claimed is:

1. An electronic initiation system for use with a firing panel, the electronic initiation system comprising:
    an input connector;
    a plurality of electronic ignition circuits (EICs) operably coupled together in series, a first EIC of the plurality of EICs being operably coupled to the input connector;
    an indicator operably coupled to an output of each EIC of the plurality of EICs,
    an output connector operably coupled to a sequentially last EIC of the plurality of EICs,
    wherein the indicator is configured to generate an indication in response to an output of an EIC of the plurality of EICs satisfying a predetermined condition; and
    the output connector is configured to operably couple to an input connector of a second electronic initiation system.

2. The electronic initiation system of claim 1, wherein the plurality of EICs are configured to be selectively activated by the firing panel, and each EIC of the plurality of EICs is configured to output an output voltage in response to an activation signal from the firing panel.

3. The electronic initiation system of claim 1, wherein the predetermined condition is whether the output of the EIC of the plurality of EICs is greater than a predetermined threshold voltage.

4. The electronic initiation system of claim 1, wherein the electronic initiation system simulates control circuitry of perforation guns in a wellbore tool string.

5. The electronic initiation system of claim 4, wherein the indicator comprises:
    a minimum voltage circuit operably coupled to the output of each EIC of the plurality of EICs and configured to determine whether an output of an EIC is greater than a predetermined threshold voltage; and
    a light-emitting diode (LED) operably coupled to the minimum voltage circuit;

wherein the minimum voltage circuit is configured to illuminate the LED in response to the minimum voltage circuit determining than an output of an EIC is greater than the predetermined threshold voltage.

6. A method for controlling an electronic initiation system, the method comprising:
providing a first electronic initiation system comprising:
a first input connector; and
a first plurality of electronic ignition circuits (EICs) serially arranged and operably coupled to the first input connector;
operably coupling a firing panel to the first input connector of the first electronic initiation system;
controlling the firing panel to transmit a signal to the first electronic initiation system; and
receiving a signal from the first electronic initiation system in response to an output of an EIC of the first plurality of EICs satisfying a predetermined condition, wherein
the controlling the firing panel to transmit a signal to the first electronic initiation system comprises:
controlling the firing panel to transmit an activation signal to activate a selected EIC of the first plurality of EICs; and
controlling the firing panel to transmit a firing signal to the activated EIC; and
the receiving a signal from the first electronic initiation system in response to an output of an EIC of the first plurality of EICs satisfying a predetermined condition comprises:
determining whether an output of the activated EIC satisfies a predetermined threshold; and
providing an indication in response to the output of the activated EIC satisfying the predetermined threshold.

7. The method of claim 6, wherein the firing panel is operably coupled to the first input connector via a wireline.

8. The method of claim 6, wherein the firing panel is operably coupled to the first input connector via a case collar locator.

9. The method of claim 6, wherein the activated EIC is a sequentially last EIC of the first plurality of EICs.

10. The method of claim 6, wherein the indication is a visual indication or an audio indication.

11. The method of claim 6, wherein the providing an indication in response to the output of the activated EIC satisfying the predetermined threshold comprises illuminating a light-emitting diode (LED).

12. The method of claim 6, wherein:
the first electronic initiation system further comprises a first output connector operably coupled to a sequentially last EIC of the plurality of EICs;
the method further comprises providing a second electronic initiation system comprising:
a second input connector;
a second circuit board comprising a second plurality of EICs serially arranged and operably coupled to the second input connector; and
the first output connector is operably coupled to the second input connector.

13. A system for simulating electronic initiation, the system comprising:

a firing panel;
a simulator operably coupled to the firing panel, the simulator comprising:
a first input connector;
a first plurality of electronic ignition circuits (EICs) operably coupled together in series;
a first EIC of the first plurality of EICs operably coupled to the first input connector; and
a first indicator operably coupled to an output of each EIC of the plurality of EICs,
wherein the first indicator is configured to generate a first indication in response to an output of an EIC of the first plurality of EICs satisfying a predetermined condition.

14. The system of claim 13, wherein:
the firing panel is configured to:
activate a selected EIC of the first plurality of EICs; and
transmit a firing signal to the selected EIC; and
each EIC of the first plurality of EICs is configured to output an output voltage in response to receiving the firing signal from the firing panel.

15. The system of claim 13, wherein the predetermined condition is whether an output voltage of the EIC of the plurality of EICs is greater than a predetermined threshold voltage.

16. The system of claim 13, wherein the indication is a visual indication or an audio indication.

17. The system of claim 13, wherein the indicator comprises:
a minimum voltage circuit operably coupled to the output of each EIC of the plurality of EICs and configured to determine whether an output of an EIC of the plurality of EICs is greater than a predetermined threshold voltage; and
a light-emitting diode (LED) operably coupled to the minimum voltage circuit,
wherein the minimum voltage circuit is configured to illuminate the LED in response to the minimum voltage circuit determining than an output of an EIC is greater than the predetermined threshold voltage.

18. The system of claim 13, wherein:
the simulator is a first simulator, and the first simulator comprises a first output connector operably coupled to a sequentially last EIC of the plurality of EICs; and
the system further comprises a second simulator comprising:
a second input connector;
a second plurality of EICs operably coupled together in series;
a first EIC of the second plurality of EICs is operably coupled to the second input connector; and
a second indicator operably coupled to an output of each EIC of the second plurality of EICs;
wherein the second indicator is configured to generate a second indication in response to an output of an EIC of the second plurality of EICs satisfying the predetermined condition; and
the second input connector is operably coupled to the first output connector.

* * * * *